United States Patent
Tsujimoto et al.

(10) Patent No.: US 12,394,437 B2
(45) Date of Patent: Aug. 19, 2025

(54) MAGNETIC TAPE, MAGNETIC TAPE CARTRIDGE, AND MAGNETIC TAPE DEVICE

(71) Applicant: FUJIFILM Corporation, Tokyo (JP)

(72) Inventors: Shinji Tsujimoto, Minamiashigara (JP); Shunichi Hoshino, Minamiashigara (JP); Yoshihiro Sawayashiki, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 65 days.

(21) Appl. No.: 18/161,509

(22) Filed: Jan. 30, 2023

(65) Prior Publication Data

US 2023/0178107 A1    Jun. 8, 2023

Related U.S. Application Data

(63) Continuation of application No. PCT/JP2021/028014, filed on Jul. 29, 2021.

(30) Foreign Application Priority Data

Jul. 31, 2020 (JP) ................. 2020-130865

(51) Int. Cl.
*G11B 5/735* (2006.01)
*G11B 5/78* (2006.01)

(52) U.S. Cl.
CPC ............. *G11B 5/7353* (2019.05); *G11B 5/78* (2013.01)

(58) Field of Classification Search
CPC ........... G11B 5/7353; G11B 5/78; G11B 5/68; G11B 5/70; G11B 5/706; G11B 5/70605; G11B 5/70642–70657; G11B 5/70678–7085; G11B 5/71
See application file for complete search history.

(56) References Cited

U.S. PATENT DOCUMENTS

| | | | |
|---|---|---|---|
| 5,512,350 A * | 4/1996 | Ryoke ...................... | G11B 5/84 428/323 |
| 2006/0166040 A1 | 7/2006 | Konno et al. | |
| 2018/0240490 A1 | 8/2018 | Kurokawa et al. | |
| 2018/0291302 A1 | 10/2018 | Kondo et al. | |
| 2018/0358043 A1 | 12/2018 | Naoi et al. | |

(Continued)

FOREIGN PATENT DOCUMENTS

| CN | 1816849 A | 8/2006 |
|---|---|---|
| CN | 101029263 A | 9/2007 |

(Continued)

OTHER PUBLICATIONS

International Search Report dated Oct. 26, 2021 issued in Application No. PCT/JP2021/028014.

(Continued)

*Primary Examiner* — Holly Rickman
(74) *Attorney, Agent, or Firm* — Sughrue Mion, PLLC

(57) ABSTRACT

Provided are a magnetic tape including a non-magnetic support and a magnetic layer including a ferromagnetic powder, a magnetic tape cartridge and a magnetic tape apparatus including this magnetic tape. An amount of a fluid lubricant collected by wiping a surface of the magnetic layer by a nonwoven fabric is in a range of 5 to 400 ng/m² as a value per unit area of the surface of the magnetic layer.

19 Claims, 2 Drawing Sheets

(56) References Cited

U.S. PATENT DOCUMENTS

2019/0259417 A1     8/2019   Kagawa et al.
2019/0304496 A1   10/2019   Fujimoto
2022/0165301 A1     5/2022   Yamaga et al.

FOREIGN PATENT DOCUMENTS

| | | |
|---|---|---|
| CN | 108690676 A | 10/2018 |
| CN | 109036475 A | 12/2018 |
| CN | 110176255 A | 8/2019 |
| CN | 110322902 A | 10/2019 |
| JP | 2002-367142 A | 12/2002 |
| JP | 2005-50477 A | 2/2005 |
| JP | 2018-137016 A | 8/2018 |
| JP | 2019-16421 A | 1/2019 |
| JP | 6645613 B1 | 2/2020 |

OTHER PUBLICATIONS

Written Opinion dated Oct. 26, 2021 issued in Application No. PCT/JP2021/028014.
International Preliminary Report on Patentability dated Jan. 31, 2023 with a Translation of the Written Opinion of the International Searching Authority in Application No. PCT/JP2021/028014.
Office Action dated Aug. 8, 2023 issued by the Japanese Patent Office in Japanese Application No. 2020-130865.
Office Action issued Mar. 25, 2025 in Chinese Application No. 202180058588.4.
Office Action issued Jun. 25, 2025 in Chinese Application No. 202180058588.4.

\* cited by examiner

MAGNETIC TAPE, MAGNETIC TAPE CARTRIDGE, AND MAGNETIC TAPE DEVICE

CROSS-REFERENCE TO RELATED APPLICATIONS

This application is a Continuation of PCT International Application No. PCDP2021/028014 filed on Jul. 29, 2021, which claims priority under 35 U.S.C. § 119(a) to Japanese Patent Application No. 2020-130865 filed on Jul. 31, 2020. Each of the above applications is hereby expressly incorporated by reference, in its entirety, into the present application.

BACKGROUND OF THE INVENTION

1. Field of the Invention

The present invention relates to a magnetic tape, a magnetic tape cartridge, and a magnetic tape device.

2. Description of the Related Art

Magnetic recording media are divided into tape-shaped magnetic recording media and disk-shaped magnetic recording media, and tape-shaped magnetic recording media, that is, magnetic tapes are mainly used for data storage such as data back-up or archives (for example, see JP2002-367142A).

SUMMARY OF THE INVENTION

A magnetic tape is required to exhibit excellent electromagnetic conversion characteristics.

Meanwhile, in recent years, a magnetic tape used for data storage is used in a data center in which a temperature is managed. Meanwhile, in the data center, power saving is necessary for reducing the cost. For realizing the power saving, the management conditions of the temperature of the data center can be alleviated compared to the current state, or the managing may not be necessary. However, it is assumed that, in a case where the temperature management conditions are relaxed or not managed, the magnetic tape is exposed to a high temperature.

Regarding the above point, according to the studies by the present inventors, it is clear that, in a high temperature environment (for example, in a severe high temperature environment of 60° C. or higher), in a case where data is record on the magnetic tape and/or data recorded on the magnetic tape is reproduced by repeatedly running the magnetic tape, the electromagnetic conversion characteristics tend to easily deteriorate.

According to an aspect of the present invention, an object is to provide a magnetic tape having less deterioration in electromagnetic conversion characteristics even after repeated running in a high temperature environment.

According to an aspect of the invention, there is provided a magnetic tape comprising: a non-magnetic support; and a magnetic layer containing a ferromagnetic powder, in which an amount of a fluid lubricant collected by wiping a surface of the magnetic layer by a nonwoven fabric is in a range of 5 to 400 $ng/m^2$ as a value per unit area of the surface of the magnetic layer.

In one embodiment, the amount of the fluid lubricant may be in the range of 30 to 250 $ng/m^2$.

In one embodiment, the amount of the fluid lubricant may be in the range of 120 to 200 $ng/m^2$.

In one embodiment, a projection cross section area 0.1% spacing on the surface of the magnetic layer may be in a range of 1.0 to 20.0 nm.

In one embodiment, the projection cross section area 0.1% spacing may be in a range of 1.0 to 10.0 nm.

In one embodiment, the projection cross section area 0.1% spacing may be in a range of 1.0 to 7.0 nm.

In one embodiment, the magnetic tape may further include a non-magnetic layer containing a non-magnetic powder between the non-magnetic support and the magnetic layer.

In one embodiment, the magnetic tape may include a back coating layer containing a non-magnetic powder on a surface side of the non-magnetic support opposite to a surface side including the magnetic layer.

According to another aspect of the invention, there is provided a magnetic tape cartridge comprising the magnetic tape described above.

According to still another aspect of the invention, there is provided a magnetic tape device comprising the magnetic tape and a magnetic head.

According to one aspect of the present invention, it is possible to provide a magnetic tape having less deterioration in electromagnetic conversion characteristics even after repeated running in the high temperature environment, and a magnetic tape cartridge and a magnetic tape device including the magnetic tape.

DESCRIPTION OF THE PREFERRED EMBODIMENTS

[Magnetic Tape]

An aspect of the invention relates to a magnetic tape including a non-magnetic support, and a magnetic layer containing a ferromagnetic powder. In the magnetic tape, the amount of a fluid lubricant collected by wiping a surface of the magnetic layer by a nonwoven fabric is in a range of 5 to 400 nanogram (ng)/$m^2$ as a value per unit area of the surface of the magnetic layer.

In the invention and the specification, the amount of fluid lubricant is obtained by the following method. In the invention and the specification, the "surface of the magnetic layer" is identical to a surface of the magnetic tape on the magnetic layer side.

Figure 1:
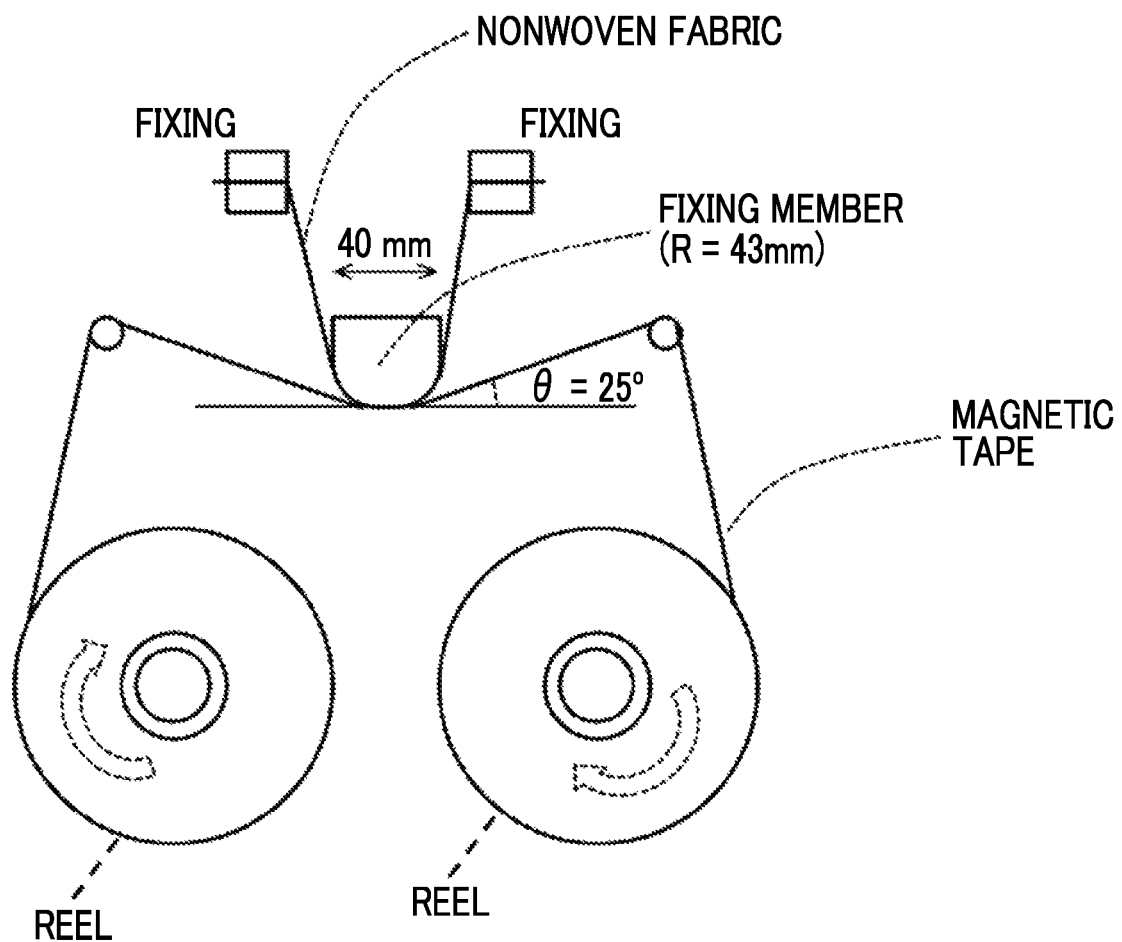
FIG. 1 shows an example of an apparatus used for wiping a surface of a magnetic layer of a magnetic tape.

FIG. 1 shows an example of an apparatus used for wiping a surface of a magnetic layer of a magnetic tape. The wiping is performed in an environment in which an atmosphere temperature is 23° C. and relative humidity is 50%.

As shown in FIG. 1, a reel tester having two tape reels is used. As the reel tester, a commercially available product or a reel tester assembled by a well-known method can be used.

In a reel tester, a fixing member is usually provided at a portion where a magnetic head is attached. As the fixing member, a fixing member having a curved surface having a curvature radius R=43 mm is used. As the fixing member, a hemispherical fixing member can be used, and a diameter of the hemisphere can be, for example, 40 mm.

The nonwoven fabric used for wiping is a nonwoven fabric which satisfies the following conditions. As the nonwoven fabric, a new unused nonwoven fabric which does not contain a component which affects a quantitative result of the fluid lubricant in quantitative analysis which will be described later, or does not contain the amount of the component which affects the quantitative result, is used. Examples of such a component include components which will be described later, fatty acid, and fatty acid amide, which are contained in the fluid lubricant in the present invention and the present specification. The amount which does not affect the quantitative result can be the amount which is less than a detection limit in the quantitative analysis performed by a method which will be described later. No solvent is applied to the nonwoven fabric. For example, as the nonwoven fabric, 4000CR manufactured by Bailen Japan Co., Ltd. can be used.

Weight: 40±5 g/m$^2$
Thickness: 0.27±0.05 μm
Width: 25 mm
Average fiber diameter: 10±5 μm
Material: Mixture of rayon/polyester/nylon (mixing ratio is random)

At the time of the wiping, the nonwoven fabric is not allowed to run and is fixed. A tension applied to the nonwoven fabric is 225 gf. In terms of unit, "gf" represents gram weight and 1 N (Newton) is approximately 102 gf.

A magnetic tape is caused to run on a reel tester to bring the surface of the magnetic layer into contact with the nonwoven fabric and wipe off with the nonwoven fabric. The running conditions of the magnetic tape are as follows. Here, a value of the tension applied to the magnetic tape in the longitudinal direction is a set value of the reel tester. A "running length" hereinafter has the same meaning as a length in the longitudinal direction of a portion of the magnetic tape which comes into contact with the nonwoven fabric during the running.

Running speed of magnetic tape: 2 m/sec
Tension applied in the longitudinal direction of the magnetic tape: 100 gf
Running length of magnetic tape: 200 m
Running pass of magnetic tape: 1 single pass
Lap angle θ: 25°

After the wiping, a piece of cloth having a length of 60 mm is cut out from the nonwoven fabric. The piece of cloth to be cut includes a portion which was in contact with the magnetic tape at the time of wiping.

The cut-out piece of cloth is put into a container. As the container, for example, a sample bottle having a volume of 13.5 cm$^3$ can be used. n-hexane having a volume of 10 cm$^3$ is put into the container. A lid of the container is closed, and the mixture is left in an environment having an atmosphere temperature of 23° C. overnight to extract components from the nonwoven fabric.

The quantitative analysis of the fluid lubricant in n-hexane (hereinafter, referred to as "extract") in the container is performed by a multiple reaction monitoring (MRM) using a gas chromatograph tandem mass spectrometer (GC/MS/MS). Analysis conditions (for example, an injector temperature, a detector temperature, a column temperature, a column type, and the like) of the quantitative analysis can be determined according to the type of the fluid lubricant to be quantitatively analyzed, and as an example, analysis conditions described in the examples which will be described later can be used. In a case where the type of the fluid lubricant contained in the magnetic tape to be measured is unknown, the qualitative analysis of the component contained in the magnetic tape to be measured can be performed by a well-known method and the type of the contained fluid lubricant can be specified.

By dividing the quantitative value obtained by the quantitative analysis by an area of the surface of the magnetic layer in contact with the nonwoven fabric during the wiping, the amount of fluid lubricant collected from the surface of the magnetic layer by the wiping is calculated as a value per unit area (1 m$^2$) of the surface of the magnetic layer. In a case where a plurality of components are collected as the fluid lubricant, the calculation is performed for a total of these quantitative values.

In the present invention and the present specification, the "fluid lubricant" refers to a compound selected from the group consisting of fatty acid ester, carbonic acid ester, organic amine, and a fluorine-containing compound. Specific examples thereof will be described later.

In the magnetic tape, the amount of the fluid lubricant obtained by the method described above is in the range of 5 to 400 ng/m$^2$. As a result of intensive studies of the present inventors, it was newly found that, according to the magnetic tape, it is possible to suppress the deterioration in the electromagnetic conversion characteristics even when the running of the magnetic tape is repeated in a high temperature environment. This will be described in detail below.

The recording of data on the magnetic tape and the reproducing of the recorded data are performed by bringing the surface of the magnetic layer of the magnetic tape into contact with the magnetic head and sliding. It is considered that, in this sliding, the fluid lubricant can contribute to suppressing the occurrence of stick slip between the magnetic head and the surface of the magnetic layer. However, it is considered that, in the high temperature environment, particularly, in the severe high temperature environment of 60° C. or higher, the fluid lubricant of the surface of the magnetic layer is depleted due to the sliding with the magnetic head and/or the exposure to the high temperature environment, and the stick slip may occur between the magnetic head and the surface of the magnetic layer. It is assumed that the occurrence of a spacing change due to this stick slip is a reason of a deterioration in the electromagnetic conversion characteristics in the repeated running in the high temperature environment. The inventors consider that the recording to a deep portion of the magnetic layer becoming difficult due to the occurrence of the spacing change may be a reason for the deterioration in the electromagnetic conversion characteristics.

Regarding the lubricant, in JP2002-367142A described above, the amount of the lubricant extracted by n-hexane is measured for the magnetic tape. This extraction is performed by immersing a sample cut from the magnetic tape in n-hexane (paragraph 0203 of JP2002-367142A). However, it is considered that, by simply increasing the amount of the lubricant extracted in this way, the durability is deteriorated due to the plasticization of the magnetic layer, and/or, in the magnetic tape including the back coating layer, a surface shape of the back coating layer is likely to be transferred to the surface of the magnetic layer, thereby deteriorating the electromagnetic conversion characteristics.

On the other hand, the present inventors consider that the amount of the fluid lubricant collected from the surface of the magnetic layer by wiping on the nonwoven fabric as described above can correspond to the amount of fluid lubricant which bleeds out to the surface of the magnetic layer from the layer by receiving shearing and/or pressure during the sliding with the magnetic head to exhibit the lubricating performance in an excellent manner. The present inventors surmise that, in a case of sliding on the surface of the magnetic layer of the magnetic tape having the amount of fluid lubricant in the above range, an appropriate amount of the fluid lubricant can be supplied to the magnetic head, and as a result, it is possible to suppress the deterioration in the electromagnetic conversion characteristics during the repeated running in the high temperature environment. Here, the reason for setting the fluid lubricant to be measured among the lubricants is because it is considered that the fluid lubricant can contribute to suppressing the occurrence of the stick slip by forming a liquid film on the surface of the magnetic layer.

However, the above includes the surmise of the present inventors. The invention is not limited to other surmises described in this specification.

Hereinafter, the magnetic tape will be described more specifically.

<Amount of Fluid Lubricant>

In the magnetic tape, the amount of a fluid lubricant collected by wiping a surface of the magnetic layer by a nonwoven fabric is in a range of 5 to 400 $ng/m^2$ as a value per unit area of the surface of the magnetic layer. In a case of the surface of the magnetic layer having the amount of fluid lubricant of 5 $nm/m^2$, it is considered that an appropriate amount of the fluid lubricant can exist on the surface of the magnetic layer during the sliding with the magnetic head, and as a result, it is surmised that it is possible to suppress the deterioration in the electromagnetic conversion characteristics during the repeated running in the high temperature environment. From the viewpoint described above, the amount of the fluid lubricant is 5 $ng/m^2$ or more, preferably 10 $ng/m^2$ or more, more preferably 20 $ng/m^2$ or more, even more preferably 30 $ng/m^2$ or more, still preferably 40 $ng/m^2$ or more, and still more preferably in the order of 50 $ng/m^2$ or more, 60 $ng/m^2$ or more, 70 $ng/m^2$ or more, 80 $ng/m^2$ or more, 90 $ng/m^2$ or more, 100 $ng/m^2$ or more, 110 $ng/m^2$ or more, and 120 $ng/m^2$ or more.

On the other hand, it is surmised that, in the magnetic tape, in a case where the amount of the fluid lubricant is 400 $ng/m^2$ or less, it is possible to suppress the formation of a meniscus of the fluid lubricant between the magnetic head and the surface of the magnetic layer during the sliding with the magnetic head. It is considered that this contributes to suppressing the occurrence of the magnetic head sticking. From the viewpoint described above, the amount of the fluid lubricant is 400 $ng/m^2$ or less, preferably 350 $ng/m^2$ or less, more preferably 300 $ng/m^2$ or less, even more preferably 250 $ng/m^2$ or less, and still preferably 200 $ng/m^2$ or less.

The means for controlling the amount of the fluid lubricant will be described later.

<Fluid Lubricant>

The fluid lubricant in the present invention and the present specification is a compound selected from the group consisting of fatty acid ester, carbonic acid ester, organic amine, and a fluorine-containing compound.

Examples of the fatty acid ester include monofatty acid ester composed of monobasic fatty acid having 10 to 24 carbon atoms (which may contain an unsaturated bond or may be branched) and monovalent, divalent, trivalent, tetravalent, or hexavalent alcohol having 2 to 24 carbon atoms (which may contain an unsaturated bond or may be branched), di-fatty acid ester or tri-fatty acid ester, fatty acid ester of a monoalkyl ether of an alkylene oxide polymer. The fatty acid ester is more preferably monofatty acid ester, for example, butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, and the like.

Examples of the carbonic acid ester include carbonic acid ester described in JP2008-239575A.

Examples of the organic amine include organic primary amine, organic secondary amine, and organic tertiary amine, the organic amine is preferably organic secondary amine and organic tertiary amine, more preferably organic tertiary amine, and even more preferably trialkylamine. The alkyl group contained in the trialkylamine is preferably an alkyl group having 1 to 18 carbon atoms. The three alkyl groups contained in the trialkylamine may be the same or different.

A fluorine-containing compound is a compound containing one or more fluorine atoms (F) per molecule, and specific examples thereof include fluoroalkylcarboxylic acid esters. The fluorine-containing compound is more preferably a fluorine-containing compound represented by Rf-(L)n-COOR, Rf represents a fluorine-containing hydrocarbon group, L represents a divalent linking group, R represents an alkyl group or a fluorine-containing hydrocarbon group, and n is 0 or 1.

A fluorine-containing hydrocarbon group is a monovalent group in which one or more of the hydrogen atoms constituting a saturated or unsaturated linear or branched hydrocarbon group are substituted with a fluorine atom. The number of carbon atoms of the fluorine-containing hydrocarbon group is 1 or more, preferably 2 or more, and more preferably 3 or more. The number of carbon atoms of the fluorine-containing hydrocarbon group is preferably 20 or less, more preferably 18 or less, even more preferably 16 or less, still preferably 14 or less, still more preferably 12 or less, still even more preferably 10 or less, and still further preferably 8 or less. The fluorine-containing hydrocarbon group represented by Rf is preferably a fluorine-substituted alkyl group in which one or more of the hydrogen atoms constituting the alkyl group are substituted with a fluorine atom, more preferably a fluorine-substituted alkyl group in which two or more of the hydrogen atoms constituting the alkyl group are substituted with a fluorine atom, and even more preferably a perfluoroalkyl group in which all of the hydrogen atoms constituting the alkyl group are substituted with a fluorine atom.

Examples of the divalent linking group represented by L include an alkylene group, an ester group (—C(=O)O—), or a divalent linking group consisting of a combination of an alkylene group and an ester group. The alkylene group contained in the divalent linking group represented by L can be, for example, an alkylene group having 1 to 20 carbon atoms. A divalent linking group consisting of a combination of an alkylene group and an ester group can include one or more alkylene groups and one or more ester groups. In a case where the linking group represented by L contains two or more alkylene groups, the number of carbon atoms of the alkylene group described above is a total number of carbon atoms of the contained alkylene group. The alkylene group contained in the divalent linking group represented by L can be a substituted or unsubstituted alkylene group. Examples of the substituent contained in the substituted alkylene group include a hydroxy group, a carboxy group, and a salt thereof (for example, an alkali metal salt), a sulfonic acid group and a salt thereof (for example, an alkali metal salt), and a phosphoric acid group and a salt thereof (for example, alkali metal salt). The number of carbon atoms of the substituted alkylene group is the number of carbon atoms excluding the number of carbon atoms of the substituent portion.

Examples of the alkyl group represented by R include substituted or unsubstituted linear or branched alkyl groups. For the substituents of the substituted alkyl group, the above description regarding the substituents of the substituted alkylene group can be referred to. The number of carbon atoms of the alkyl group represented by R can also be 1 or more and 2 or more. In addition, the number of carbon atoms of the alkyl group represented by R can be, for example, 10 or less, 8 or less, 6 or less, 4 or less, or 2 or less. The number of carbon atoms of the substituted alkyl group is the number of carbon atoms excluding the number of carbon atoms of the substituent portion.

For the fluorine-containing hydrocarbon group represented by R, the above description regarding the fluorine-containing hydrocarbon group represented by Rf can be referred to.

The magnetic tape can include one kind or two or more kinds of fluid lubricants in a portion on the non-magnetic support on the magnetic layer side. In the invention and the specification, the "portion of the magnetic layer side on the non-magnetic support" is a magnetic layer regarding the magnetic tape including the magnetic layer directly on the non-magnetic support, and is a magnetic layer and/or a non-magnetic layer regarding the magnetic tape including the non-magnetic layer which will be described later in detail between the non-magnetic support and the magnetic layer. Hereinafter, the "portion of the magnetic layer side on the non-magnetic support" is also simply referred to as a "portion of the magnetic layer side". The presence on the surface of the magnetic tape on the magnetic layer side is also included in the inclusion in the portion on the magnetic layer side. It is considered that, in the magnetic tape in which the amount of fluid lubricant obtained by the method described above is in the range described above, an appropriate amount of the fluid lubricant contained in the portion on the magnetic layer side of the magnetic tape can bleed out to the surface of the magnetic layer from a layer of the portion on the magnetic layer side by receiving shearing and/or pressure during the sliding between the magnetic head and the surface of the magnetic layer, and the present inventors surmise that this can suppress the deterioration in the electromagnetic conversion characteristics during the repeated running in the high temperature environment.

The magnetic tape including the fluid lubricant in the portion on the magnetic layer side can be manufactured, for example, by adding the fluid lubricant as a component of a magnetic layer forming composition. In this case, a content of the fluid lubricant in the magnetic layer forming composition (or the magnetic layer; the same applies hereinafter) is preferably in a range of 0.2 to 7.0 parts by mass and more preferably in a range of 1.0 to 4.0 parts by mass with respect to 100.0 parts by mass of the ferromagnetic powder. In a case where two or more kinds of fluid lubricants are contained, the content is a total content thereof. The same also applies to various contents of the invention and the specification.

In a magnetic tape including the non-magnetic layer, the fluid lubricant may be included in the non-magnetic layer. The magnetic tape including the fluid lubricant in the non-magnetic layer can be manufactured by adding the fluid lubricant as a component of a non-magnetic layer forming composition. In this case, a content of the fluid lubricant in the non-magnetic layer forming composition (or the non-magnetic layer; the same applies hereinafter) is preferably in a range of 0.2 to 7.0 parts by mass and more preferably in a range of 1.0 to 4.0 parts by mass with respect to 100.0 parts by mass of the non-magnetic powder. The fluid lubricant contained in the non-magnetic layer can bleed out to the surface of the magnetic layer during the sliding with the magnetic head, for example.

As the amount of the fluid lubricant added to the magnetic layer forming composition and/or the non-magnetic layer forming composition is increased, the value of the amount of the fluid lubricant obtained by the method described above tends to increase.

<Fatty Acid and Fatty Acid Amide>

In the magnetic tape, one or more kinds of component selected from the group consisting of fatty acid and fatty acid amide can be included in a portion on the magnetic layer side. Fatty acid and fatty acid amide are components which can function as a boundary lubricant. The boundary lubricant is considered as a component capable of adsorbing on a surface of a powder to form a lubricating film. The present inventors consider that adsorbing of fatty acid and/or fatty acid amide to particles of a non-magnetic powder (for example, an abrasive and/or a projection formation agent which will be described later) contained in the magnetic layer can contribute to an increase in the value of the amount of fluid lubricant obtained by the method described above. In detail, the present inventors consider as follows. In the magnetic layer, the non-magnetic powder (abrasive and/or projection formation agent) can exist as projections on the surface of the magnetic layer, and during the contact in the nonwoven fabric, on the surface of the magnetic layer, the projection can come into contact with (so-called real contact) the magnetic head. It is considered that, in a case where the fatty acid and/or the fatty acid amide is adsorbed on the particles forming the projections, the affinity between the particles and the fluid lubricant can be enhanced, and as a result, it is possible to increase the amount of the fluid lubricant in the layer to be collected with the nonwoven fabric through the particles. It is surmised that, in such a magnetic tape, the fluid lubricant easily bleeds out to the surface of the magnetic layer from the layer by the sliding with the magnetic head, and this can contribute to suppressing the deterioration in the electromagnetic conversion characteristics during the repeated running in the high temperature environment. For example, the present inventors consider that, in the preparation of the magnetic layer forming composition, a dispersion process (so-called separate dispersion) performed by mixing the non-magnetic powder with the component selected from the group consisting of fatty acid and/or fatty acid amide before mixing with the ferromagnetic powder can contribute to the adsorbing of the component selected from the group consisting of fatty acid and/or fatty acid amide to the particles of the non-magnetic powder and/or increasing of the adsorption amount.

Examples of fatty acid include lauric acid, myristic acid, palmitic acid, stearic acid, oleic acid, linoleic acid, linolenic acid, behenic acid, erucic acid, and elaidic acid, stearic acid, myristic acid, and palmitic acid are preferable, and stearic acid is more preferable. Fatty acid may be included in the portion on the magnetic layer side in a state of salt such as metal salt.

As fatty acid amide, amide of various fatty acids described above, for example, lauric acid amide, myristic acid amide, palmitic acid amide, and stearic acid amide can be used.

The content of fatty acid, as a content in the magnetic layer forming composition, is, for example, 0.1 to 5.0 parts by mass and is preferably 0.3 to 2.0 parts by mass with respect to 100.0 parts by mass of ferromagnetic powder.

During the separate dispersion, the amount of fatty acid mixed with the abrasive is, for example, 1.0 to 25.0 parts by mass and preferably 5.0 to 15.0 parts by mass with respect to 100.0 parts by mass of the abrasive.

During the separate dispersion, the amount of fatty acid mixed with the projection formation agent is, for example, 1.0 to 25.0 parts by mass and preferably 5.0 to 15.0 parts by mass with respect to 100.0 parts by mass of the projection formation agent.

The content of fatty acid amide in the magnetic layer forming composition is, for example, 0.1 to 1.0 parts by mass and is preferably 0.2 to 0.6 parts by mass with respect to 100.0 parts by mass of ferromagnetic powder.

During the separate dispersion, the amount of fatty acid amide mixed with the abrasive is, for example, 1.0 to 10.0 parts by mass and preferably 3.0 to 6.0 parts by mass with respect to 100.0 parts by mass of the abrasive.

During the separate dispersion, the amount of fatty acid amide mixed with the projection formation agent is, for example, 1.0 to 10.0 parts by mass and preferably 3.0 to 6.0 parts by mass with respect to 100.0 parts by mass of the projection formation agent.

The fatty acid and/or the fatty acid amide can also be added to the non-magnetic layer forming composition.

The content of fatty acid in the non-magnetic layer forming composition is, for example, 1.0 to 10.0 parts by mass and is preferably 0.5 to 7.0 parts by mass with respect to 100.0 parts by mass of non-magnetic powder.

The content of fatty acid amide in the non-magnetic layer forming composition is, for example, 0.1 to 3.0 parts by mass and is preferably 0.1 to 1.0 parts by mass with respect to 100.0 parts by mass of non-magnetic powder.

<Projection Cross Section Area 0.1% Spacing on Surface of Magnetic Layer>

In one embodiment, in the magnetic tape, the projection cross section area 0.1% spacing on the surface of the magnetic layer is preferably 1.0 to 20.0 nm.

In the present invention and the present specification, the projection cross section area 0.1% spacing on the surface of the magnetic layer is obtained by the following method and is a value which can be said as an indicator of a roughness of the surface of the magnetic layer.

A randomly selected region (area 40 μm×40 μm) of the surface of the magnetic layer of the magnetic tape to be measured is measured by using an atomic force microscope (AFM) in a tapping mode. The measurement is performed at 10 different points. As the AFM, for example, Nanoscope4 manufactured by Veeco can be used. As a probe, for example, RTESS-300 manufactured by BRUKER can be used. The resolution is 512 pixel×512 pixel, and a scanning speed is a speed at which one screen (512 pixel×512 pixel) is measured in 341 seconds. The data obtained by the measurement is subjected to a Flatten: 3rd-order filtering process, and then the following process is performed to calculate the projection cross section area 0.1% spacing.

The data after the filtering process is converted into a text file. Height data from 512×512=262,144 reference surfaces is converted into a text file. The reference surface is a surface (height zero) in which the volumes of the projections and the recesses are equal to each other.

The 262nd (corresponding to 0.1%) largest value is read with respect to 512×512=262,144 values. The value is defined as a projection cross section area 0.1% spacing.

The value of the projection cross section area 0.1% spacing is obtained for 10 measurement portions, and an arithmetic mean thereof is the projection cross section area 0.1% spacing on the surface of the magnetic layer of the magnetic tape to be measured.

For the projection cross section area 0.1% spacing obtained by the method described above, the present inventors consider that, as this value is large, it can be said that the non-magnetic powder (abrasive and/or projection formation agent) forms a coarse aggregate in the magnetic layer. It is surmised that, due to the formation of the coarse aggregate, a contact frequency of a contact between the projection existing on the surface of the magnetic layer and the nonwoven fabric (so-called real contact) decreases, and as a result, the amount of the fluid lubricant in the layer collected with the nonwoven fabric through the particles of the non-magnetic powder decreases, and accordingly, the value of the amount of the fluid lubricant obtained by the method described above decreases. On the other hand, in a case where the formation of the coarse aggregate is suppressed so as to reduce the value of the projection cross section area 0.1% spacing, it is considered that it is possible to increase the value of the amount of the fluid lubricant obtained by the method described above, and in such a magnetic tape, it is surmised that, during the sliding, the fluid lubricant easily bleeds out to the surface of the magnetic layer from the layer due to the contact with the magnetic head and this can contribute to suppressing of the deterioration in the electromagnetic conversion characteristics during the repeated running in the high temperature environment. From the viewpoint described above, in the magnetic tape, the projection cross section area 0.1% spacing on the surface of the magnetic layer is preferably 20.0 nm or less, more preferably 18.0 nm or less, even more preferably 16.0 nm or less, still preferably 14.0 nm or less, still more preferably 12.0 nm or less, still even more preferably 10.0 nm or less, and still further preferably 7.0 nm or less. In addition, in the magnetic tape, the projection cross section area 0.1% spacing on the surface of the magnetic layer is preferably 1.0 nm or more and more preferably 1.2 nm or more, from a viewpoint of further suppressing the deterioration in the electromagnetic conversion characteristics during the repeated running in the high temperature environment.

The projection cross section area 0.1% spacing on the surface of the magnetic layer can be controlled by dispersion conditions in a case of preparing the magnetic layer forming composition. For example, as the dispersion conditions of the abrasive and/or the projection formation agent to be separately dispersed are reinforced, the value of the projection cross section area 0.1% spacing on the surface of the magnetic layer tends to decrease. Examples of the reinforcement of the dispersion conditions include a use of beads having a small diameter as dispersion beads, an increase in dispersion time, an increase in number of dispersion passes, and the like.

Hereinafter, the magnetic tape will be described more specifically.

<Magnetic Layer>

(Ferromagnetic Powder)

As the ferromagnetic powder contained in the magnetic layer, a well-known ferromagnetic powder can be used as one kind or in combination of two or more kinds as the ferromagnetic powder used in the magnetic layer of various magnetic recording media. It is preferable to use a ferromagnetic powder having an average particle size as the ferromagnetic powder, from a viewpoint of improvement of a recording density. From this viewpoint, an average particle size of the ferromagnetic powder is preferably equal to or smaller than 50 nm, more preferably equal to or smaller than 45 nm, even more preferably equal to or smaller than 40 nm, further preferably equal to or smaller than 35 nm, further more preferably equal to or smaller than 30 nm, further even more preferably equal to or smaller than 25 nm, and still preferably equal to or smaller than 20 nm. Meanwhile, from a viewpoint of stability of magnetization, the average particle size of the ferromagnetic powder is preferably equal to or greater than 5 nm, more preferably equal to or greater than 8 nm, even more preferably equal to or greater than 10 nm, still preferably equal to or greater than 15 nm, and still more preferably equal to or greater than 20 nm.

Hexagonal Ferrite Powder

As a preferred specific example of the ferromagnetic powder, a hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which a main divalent metal atom included in this powder is a strontium atom, and the hexagonal barium ferrite powder is a powder in which a main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one aspect of the hexagonal ferrite powder will be described more specifically.

An activation volume of the hexagonal strontium ferrite powder is preferably in a range of 800 to 1,600 nm$^3$. The atomized hexagonal strontium ferrite powder showing the activation volume in the range described above is suitable for manufacturing a magnetic tape exhibiting excellent electromagnetic conversion characteristics. The activation volume of the hexagonal strontium ferrite powder is preferably equal to or greater than 800 nm$^3$, and can also be, for example, equal to or greater than 850 nm$^3$. In addition, from a viewpoint of further improving the electromagnetic conversion characteristics, the activation volume of the hexagonal strontium ferrite powder is more preferably equal to or smaller than 1,500 nm$^3$, even more preferably equal to or smaller than 1,400 nm$^3$, still preferably equal to or smaller than 1,300 nm$^3$, still more preferably equal to or smaller than 1,200 nm$^3$, and still even more preferably equal to or smaller than 1,100 nm$^3$. The same applies to the activation volume of the hexagonal barium ferrite powder.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using an oscillation sample type magnetic-flux meter (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$.

$$Hc=2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10$^5$ J/m$^3$, and more preferably have Ku equal to or greater than 2.0×10$^5$ J/m$^3$. In addition, Ku of the hexagonal strontium ferrite powder can be, for example, equal to or smaller than 2.5×10$^5$ J/m$^3$. However, the high Ku is preferable, because it means high thermal stability, and thus, Ku is not limited to the exemplified value.

The hexagonal strontium ferrite powder may or may not include the rare earth atom. In a case where the hexagonal strontium ferrite powder includes the rare earth atom, a content (bulk content) of the rare earth atom is preferably 0.5 to 5.0 atom % with respect to 100 atom % of the iron atom. In one embodiment, the hexagonal strontium ferrite powder including the rare earth atom can have a rare earth atom surface layer portion uneven distribution. The "rare earth atom surface layer portion uneven distribution" of the invention and the specification means that a content of rare earth atom with respect to 100 atom % of iron atom in a solution obtained by partially dissolving the hexagonal strontium ferrite powder with acid (hereinafter, referred to as a "rare earth atom surface layer portion content" or simply a "surface layer portion content" regarding the rare earth atom) and a content of rare earth atom with respect to 100 atom % of iron atom in a solution obtained by totally dissolving the hexagonal strontium ferrite powder with acid (hereinafter, referred to as a "rare earth atom bulk content" or simply a "bulk content" regarding the rare earth atom) satisfy a ratio of rare earth atom surface layer portion content/rare earth atom bulk content >1.0.

The content of rare earth atom of the hexagonal strontium ferrite powder which will be described later is identical to the rare earth atom bulk content. With respect to this, the partial dissolving using acid is to dissolve the surface layer portion of particles configuring the hexagonal strontium ferrite powder, and accordingly, the content of rare earth atom in the solution obtained by the partial dissolving is the content of rare earth atom in the surface layer portion of the particles configuring the hexagonal strontium ferrite powder. The rare earth atom surface layer portion content satisfying a ratio of "rare earth atom surface layer portion content/rare earth atom bulk content >1.0" means that the rare earth atoms are unevenly distributed in the surface layer portion (that is, a larger amount of the rare earth atoms is present, compared to that inside), among the particles configuring the hexagonal strontium ferrite powder. The surface layer portion of the invention and the specification means a part of the region of the particles configuring the hexagonal strontium ferrite powder towards the inside from the surface.

In a case where the hexagonal strontium ferrite powder includes the rare earth atom, a content (bulk content) of the rare earth atom is preferably in a range of 0.5 to 5.0 atom % with respect to 100 atom % of the iron atom. It is thought that the rare earth atom having the bulk content in the range described above and uneven distribution of the rare earth atom in the surface layer portion of the particles configuring the hexagonal strontium ferrite powder contribute to the prevention of a decrease in reproducing output during the repeated reproducing. It is surmised that this is because the rare earth atom having the bulk content in the range described above included in the hexagonal strontium ferrite powder and the uneven distribution of the rare earth atom in the surface layer portion of the particles configuring the hexagonal strontium ferrite powder can increase the anisotropy constant Ku. As the value of the anisotropy constant Ku is high, occurrence of a phenomenon called thermal fluctuation (that is, improvement of thermal stability) can be prevented. By preventing the occurrence of the thermal fluctuation, a decrease in reproducing output during the repeated reproducing can be prevented. It is surmised that the uneven distribution of the rare earth atom in the surface layer portion of the particles of the hexagonal strontium ferrite powder contributes to stabilization of a spin at an iron (Fe) site in a crystal lattice of the surface layer portion, thereby increasing the anisotropy constant Ku.

In addition, it is surmised that the use of the hexagonal strontium ferrite powder having the rare earth atom surface layer portion uneven distribution as the ferromagnetic powder of the magnetic layer also contributes to the prevention of chipping of the surface of the magnetic layer due to the sliding with the magnetic head. That is, it is surmised that, the hexagonal strontium ferrite powder having the rare earth atom surface layer portion uneven distribution can also contribute to the improvement of running durability of the magnetic tape. It is surmised that this is because the uneven distribution of the rare earth atom on the surface of the particles configuring the hexagonal strontium ferrite powder contributes to improvement of an interaction between the surface of the particles and an organic substance (for example, binding agent and/or additive) included in the magnetic layer, thereby improving hardness of the magnetic layer.

From a viewpoint of further preventing reduction of the reproduction output in the repeated reproduction and/or a viewpoint of further improving running durability, the content of rare earth atom (bulk content) is more preferably in a range of 0.5 to 4.5 atom %, even more preferably in a range of 1.0 to 4.5 atom %, and still preferably in a range of 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder including the rare earth atom may include only one kind of rare earth atom or may include two or more kinds of rare earth atom, as the rare earth atom. In a case where two or more kinds of rare earth atoms are included, the bulk content is obtained from the total of the two or more kinds of rare earth atoms. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes the rare earth atom, the rare earth atom included therein may be any one or more kinds of the rare earth atom. Examples of the rare earth atom preferable from a viewpoint of further preventing reduction of the reproduction output during the repeated reproduction include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having the rare earth atom surface layer portion uneven distribution, a degree of uneven distribution of the rare earth atom is not limited, as long as the rare earth atom is unevenly distributed in the surface layer portion of the particles configuring the hexagonal strontium ferrite powder. For example, regarding the hexagonal strontium ferrite powder having the rare earth atom surface layer portion uneven distribution, a ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" is greater than 1.0 and can be equal to or greater than 1.5. The "surface layer portion content/bulk content" greater than 1.0 means that the rare earth atoms are unevenly distributed in the surface layer portion (that is, a larger amount of the rare earth atoms is present, compared to that inside), in the particles configuring the hexagonal strontium ferrite powder. A ratio of the surface layer portion content of the rare earth atom obtained by partial dissolving performed under the dissolving conditions which will be described later and the bulk content of the rare earth atom obtained by total dissolving performed under the dissolving conditions which will be described later, "surface layer portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, in the hexagonal strontium ferrite powder having the rare earth atom surface layer portion uneven distribution, the "surface layer portion content/bulk content" is not limited to the exemplified upper limit or the lower limit, as long as the rare earth atom is unevenly distributed in the surface layer portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic tape, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by, for example, a method disclosed in a paragraph 0032 of JP2015-91747A.

The partial dissolving means dissolving performed so that the hexagonal strontium ferrite powder remaining in the solution can be visually confirmed in a case of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed in a case of the completion of the dissolving.

The partial dissolving and the measurement of the surface layer portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 mL of hydrochloric acid having a concentration of 1 mol/L is held on a hot plate at a set temperature of 70° C. for 1 hour. The obtained solution is filtered with a membrane filter having a hole diameter of 0.1 μm. The element analysis of the filtrate obtained as described above is performed by an inductively coupled plasma (ICP) analysis device. By doing so, the surface layer portion content of the rare earth atom with respect to 100 atom % of the iron atom can be obtained. In a case where a plurality of kinds of rare earth atoms are detected from the element analysis, a total content of the entirety of the rare earth atoms is the surface layer portion content. The same applies to the measurement of the bulk content.

Meanwhile, the total dissolving and the measurement of the bulk content are, for example, performed by the following method.

A vessel (for example, beaker) containing 12 mg of sample powder and 10 mL of hydrochloric acid having a concentration of 4 mol/L is held on a hot plate at a set temperature of 80° C. for 3 hours. After that, the process is performed in the same manner as in the partial dissolving and the measurement of the surface layer portion content, and the bulk content with respect to 100 atom % of the iron atom can be obtained.

From a viewpoint of increasing reproducing output in a case of reproducing data recorded on a magnetic tape, it is desirable that the mass magnetization σs of ferromagnetic powder included in the magnetic tape is high. In regards to this point, in hexagonal strontium ferrite powder which includes the rare earth atom but does not have the rare earth atom surface layer portion uneven distribution, σs tends to significantly decrease, compared to that in hexagonal strontium ferrite powder not including the rare earth atom. With respect to this, it is thought that, hexagonal strontium ferrite powder having the rare earth atom surface layer portion uneven distribution is also preferable for preventing such a significant decrease in σs. In one aspect, σs of the hexagonal strontium ferrite powder can be equal to or greater than 45 A×m$^2$/kg and can also be equal to or greater than 47 A×m$^2$/kg. On the other hand, from a viewpoint of noise reduction, σs is preferably equal to or smaller than 80 A×m$^2$/kg and more preferably equal to or smaller than 60 A×m$^2$/kg. σs can be measured by using a well-known measurement device capable of measuring magnetic properties such as an oscillation sample type magnetic-flux meter. In the invention and the specification, the mass magnetization σs is a value measured at a magnetic field strength of 15 kOe, unless otherwise noted. 1 [kOe]=(10$^6$/4π)[A/m]

Regarding the content (bulk content) of the constituting atom in the hexagonal strontium ferrite powder, a content of the strontium atom can be, for example, in a range of 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, the hexagonal strontium ferrite powder can include a barium atom and/or a calcium atom. In a case where the other divalent metal atom other than the strontium atom is included, a content of a barium atom and a content of a calcium atom in the hexagonal strontium ferrite powder respectively can be, for example, in a range of 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of AFe$_{12}$O$_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, and an oxygen atom, and can also include a rare earth atom. In addition, the hexagonal strontium ferrite powder may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of further preventing the reduction of the reproduction output during the repeated reproduction, the hexagonal strontium ferrite powder includes the iron atom, the strontium atom, the oxygen atom, and the rare earth atom, and a content of the atoms other than these atoms is preferably equal to or smaller than 10.0 atom %, more preferably in a range of 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting a value of the content (unit: % by mass) of each atom obtained by totally dissolving the hexagonal strontium ferrite powder into a value shown as atom % by using the atomic weight of each atom. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

Metal Powder

As a preferred specific example of the ferromagnetic powder, a ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, an ε-iron oxide powder can also be used. In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure, it is determined that the ε-iron oxide type crystal structure is detected as a main phase. As a manufacturing method of the ε-iron oxide powder, a manufacturing method from a goethite, a reverse micelle method, and the like are known. All of the manufacturing methods are well known. For the method of manufacturing the ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. 51, pp. S280-5284, J. Mater. Chem. C, 2013, 1, pp.5200-5206 can be referred, for example. However, the manufacturing method of the ε-iron oxide powder capable of being used as the ferromagnetic powder in the magnetic layer of the magnetic tape is not limited to the method described here.

An activation volume of the ε-iron oxide powder is preferably in a range of 300 to 1,500 nm$^3$. The atomized ε-iron oxide powder showing the activation volume in the range described above is suitable for manufacturing a magnetic tape exhibiting excellent electromagnetic conversion characteristics. The activation volume of the ε-iron oxide powder is preferably equal to or greater than 300 nm$^3$, and can also be, for example, equal to or greater than 500 nm$^3$. In addition, from a viewpoint of further improving the electromagnetic conversion characteristics, the activation volume of the ε-iron oxide powder is more preferably equal to or smaller than 1,400 nm$^3$, even more preferably equal to or smaller than 1,300 nm$^3$, still preferably equal to or smaller than 1,200 nm$^3$, and still more preferably equal to or smaller than 1,100 nm$^3$.

The anisotropy constant Ku can be used as an index of reduction of thermal fluctuation, that is, improvement of thermal stability. The ε-iron oxide powder can preferably have Ku equal to or greater than $3.0 \times 10^4$ J/m$^3$, and more preferably have Ku equal to or greater than $8.0 \times 10^4$ J/m$^3$. In addition, Ku of the ε-iron oxide powder can be, for example, equal to or smaller than $3.0 \times 10^5$ J/m$^3$. However, the high Ku is preferable, because it means high thermal stability, and thus, Ku is not limited to the exemplified value.

From a viewpoint of increasing reproducing output in a case of reproducing data recorded on a magnetic tape, it is desirable that the mass magnetization σs of ferromagnetic powder included in the magnetic tape is high. In regard to this point, in one aspect, σs of the ε-iron oxide powder can be equal to or greater than 8 A×m$^2$/kg and can also be equal to or greater than 12 A×m$^2$/kg. On the other hand, from a viewpoint of noise reduction, σs of the ε-iron oxide powder is preferably equal to or smaller than 40 A×m$^2$/kg and more preferably equal to or smaller than 35 A×m$^2$/kg.

In the invention and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed onto a photographic printing paper so that a total magnification ratio of 500,000 and an image of particles configuring the powder is obtained. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetic mean of the particle size of 500 particles obtained as described above is the average particle size of the powder. As the transmission electron microscope, a transmission electron microscope H-9000 manufactured by Hitachi, Ltd. can be used, for example. In addition, the measurement of the particle size can be performed by a well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles. A term, particles may be used for representing the powder.

As a method for collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a major axis configuring the particle, that is, a major axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the major axis configuring the particles cannot be specified from the shape, the particle size is shown as an equivalent circle diameter. The equivalent circle diameter is a value obtained by a circle projection method.

In addition, regarding an average acicular ratio of the powder, a length of a minor axis, that is, a minor axis length of the particles is measured in the measurement described above, a value of (major axis length/minor axis length) of each particle is obtained, and an arithmetic mean of the values obtained regarding 500 particles is calculated. Here, unless otherwise noted, in a case of (1), the minor axis length as the definition of the particle size is a length of a minor axis configuring the particle, in a case of (2), the minor axis length is a thickness or a height, and in a case of (3), the major axis and the minor axis are not distinguished, thus, the value of (major axis length/minor axis length) is assumed as 1, for convenience.

In addition, unless otherwise noted, in a case where the shape of the particle is specified, for example, in a case of definition of the particle size (1), the average particle size is an average major axis length, and in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. A high filling percentage of the ferromagnetic powder in the magnetic layer is preferable from a viewpoint of improvement of recording density.

In one embodiment, the anisotropic magnetic field Hk of the magnetic tape is preferably 10 kOe or more, more preferably 12 kOe or more, and even more preferably 14 kOe or more. From a viewpoint of improving a recording density, it is preferable that the anisotropic magnetic field Hk is high in a region where data is recorded. Meanwhile, it is considered that, in a region where the anisotropic magnetic field Hk is high, the recording to the deep portion of the magnetic layer tends to become more difficult due to the occurrence of the spacing change, and the electromagnetic conversion characteristics more easily occurs during the repeated running in the high temperature environment. On the other hand, in the magnetic tape, the amount of the fluid lubricant obtained by the method described above in the range described above can contribute to the suppressing of the deterioration in the electromagnetic conversion characteristics. In addition, the anisotropic magnetic field Hk of the magnetic tape is preferably equal to or smaller than 90 kOe, more preferably equal to or smaller than 80 kOe, and even more preferably equal to or smaller than 70 kOe.

The "anisotropic magnetic field Hk" of the magnetic tape in the invention and the specification refers to a magnetic field in which magnetization is saturated, in a case where a magnetic field is applied in a direction of the magnetization hard axis of the magnetic layer. The anisotropic magnetic field Hk can be measured by using a well-known measurement device capable of measuring magnetic properties such as a vibrating sample magnetometer. A sample piece that can be introduced into the measurement device is cut out from an area to be measured of a magnetic tape to be measured, and the Hk is measured for the sample piece at a temperature of 23° C. By setting the atmosphere temperature around the sample piece to 23° C., the temperature of the sample piece can be set to 23° C. by realizing temperature equilibrium. For example, in the magnetic layer containing a hexagonal ferrite powder and/or ε-iron oxide powder as the ferromagnetic powder, a direction of the magnetization hard axis of the magnetic layer is an in-plane direction. Regarding the unit, 1 [kOe]=$(10^6/4\pi)$[A/m].

(Binding Agent)

The magnetic tape may be a coating type magnetic tape, and can include a binding agent in the magnetic layer. The binding agent is one or more kinds of resin. As the binding agent, various resins normally used as a binding agent of a coating type magnetic recording medium can be used. As the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be a homopolymer or a copolymer. These resins can be used as the binding agent even in the non-magnetic layer and/or a back coating layer which will be described later.

For the binding agent described above, descriptions disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions. The amount of the binding agent used can be, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

(Curing Agent)

A curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, and polyisocyanate is suitable. For the details of polyisocyanate, descriptions disclosed in paragraphs 0124 and 0125 of JP2011-216149A can be referred to. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

(Additives)

The magnetic layer may include one or more kinds of additives, as necessary. As the additives, the curing agent described above is used as an example. In addition, examples of the additive included in the magnetic layer include a non-magnetic powder (abrasive and/or projection formation agent), a dispersing agent, a dispersing assistant, a fungicide, an antistatic agent, and an antioxidant. For the dispersing agent, a description disclosed in paragraphs 0061 and 0071 of JP2012-133837A can be referred to. The dispersing agent may be added to a non-magnetic layer forming composition. For the dispersing agent which can be added to the non-magnetic layer forming composition, a description disclosed in paragraph 0061 of JP2012-133837A can be referred to.

Abrasive

The abrasive is preferably a non-magnetic powder having Mohs hardness exceeding 8 and more preferably a non-magnetic powder having Mohs hardness equal to or greater than 9. A maximum value of Mohs hardness is 10. The abrasive can be a powder of an inorganic substance and can also be a powder of an organic substance. The abrasive can be a powder of an inorganic or organic oxide or a powder of a carbide. Examples of the carbide include a boron carbide (for example, $B_4C$), a titanium carbide (for example, TiC), and the like. In addition, diamond can also be used as the abrasive. In one embodiment, the abrasive is preferably a powder of an inorganic oxide. Specifically, examples of the inorganic oxide include alumina (for example, $Al_2O_3$), a titanium oxide (for example, $TiO_2$), a cerium oxide (for example, $CeO_2$), a zirconium oxide (for example, $ZrO_2$), and the like, and alumina is preferable among these. The Mohs hardness of alumina is approximately 9. For details of the alumina powder, description disclosed in paragraph 0021 of JP2013-229090A can also be referred to. In addition, a specific surface area can be used as an index of a particle size of the abrasive. It is thought that, as the specific surface area is large, the particle size of primary particles of the particles configuring the abrasive is small. As the abrasive, it is preferable to use an abrasive having a specific surface area measured by a Brunauer-Emmett-Teller (BET) method (hereinafter referred to as a "BET specific surface area") equal to or greater than 14 $m^2/g$. In addition, from a viewpoint of dispersibility, it is preferable to use an abrasive having a BET specific surface area equal to or less than 40 $m^2/g$. A content of the abrasive in the magnetic layer is preferably 1.0 to 20.0 parts by mass and more preferably 1.0 to 18.0 parts by mass with respect to 100.0 parts by mass of the ferromagnetic powder. The abrasive is preferably subjected to a dispersion process (separate dispersion) separately from the ferromagnetic powder, and more preferably subjected to a dispersion process (separate dispersion) separately from the projection formation agent. In one embodiment, as described above, it is preferable to mix the fatty acid and/or the fatty acid amide at the time of separate dispersion.

Projection Formation Agent

As one aspect of the projection formation agent, carbon black can be used. In addition, as the other embodiment of the filler, colloidal particles can be used. As the colloidal particles, inorganic colloidal particles are preferable, inorganic oxide colloidal particles are more preferable, and silica colloid particles (colloidal silica) are even more preferred, from a viewpoint of availability. In the present invention and the present specification, the "colloidal particles" are particles which are not precipitated but dispersed to generate a colloidal dispersion, in a case where 1 g of the particles is added to 100 mL of at least one organic solvent of methyl ethyl ketone, cyclohexanone, toluene, or ethyl acetate, or a mixed solvent including two or more kinds of the solvent described above at any mixing ratio. An average particle size of the projection formation agent can be, for example, 30 to 300 nm and is preferably 40 to 200 nm. A content of the projection formation agent in the magnetic layer is preferably 0.5 to 4.0 parts by mass and more preferably 0.5 to 3.5 parts by mass with respect to 100.0 parts by mass of the ferromagnetic powder. The projection formation agent is preferably subjected to a dispersion process separately from the ferromagnetic powder, and more preferably subjected to a dispersion process separately from the abrasive. In one embodiment, as described above, it is preferable to mix the fatty acid and/or the fatty acid amide at the time of separate dispersion.

The magnetic layer described above can be provided on the surface of the non-magnetic support directly or indirectly through the non-magnetic layer.

<Non-Magnetic Layer>

Next, the non-magnetic layer will be described. The magnetic tape may include a magnetic layer directly on the surface of the non-magnetic support or may include a magnetic layer on the surface of the non-magnetic support through the non-magnetic layer including the non-magnetic powder. The non-magnetic powder used in the non-magnetic layer may be a powder of an inorganic substance or a powder of an organic substance. In addition, carbon black and the like can be used. Examples of powder of the inorganic substance include powder of metal, metal oxide, metal carbonate, metal sulfate, metal nitride, metal carbide, and metal sulfide. The non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50% to 90% by mass and more preferably 60% to 90% by mass.

The non-magnetic layer can include a binding agent and can also include additives. In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

<Non-Magnetic Support>

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

<Back Coating Layer>

The magnetic tape may or may not include a back coating layer containing a non-magnetic powder on a surface side of the non-magnetic support opposite to the surface side provided with the magnetic layer. The back coating layer preferably includes any one or both of carbon black and inorganic powder. The back coating layer can include a binding agent and can also include additives. In regards to the binding agent included in the back coating layer and various additives, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of US7029774B can be referred to.

<Various Thicknesses>

Regarding a thickness (total thickness) of the magnetic tape, it has been required to increase recording capacity (increase in capacity) of the magnetic tape along with the enormous increase in amount of information in recent years. As a unit for increasing the capacity, a thickness of the magnetic tape is reduced (hereinafter, also referred to as "thinning") and a length of the magnetic tape accommodated in one reel of the magnetic tape cartridge is increased. From this point, the thickness (total thickness) of the magnetic tape is preferably 5.6 µm or less, more preferably 5.5 µm or less, even more preferably 5.4 µm or less, still preferably 5.3 µm or less, and still more preferably 5.2 µm or less. In addition, from a viewpoint of ease of handling, the thickness of the magnetic tape is preferably 3.0 µm or more and more preferably 3.5 µm or more.

The thickness (total thickness) of the magnetic tape can be measured by the following method.

Ten tape samples (for example, length of 5 to 10 cm) are cut out from a random portion of the magnetic tape, these tape samples are overlapped, and the thickness is measured. A value which is one tenth of the measured thickness (thickness per one tape sample) is set as the tape thickness. The thickness measurement can be performed using a well-known measurement device capable of performing the thickness measurement at 0.1 µm order.

A thickness of the non-magnetic support is preferably 3.0 to 5.0 µm.

A thickness of the magnetic layer can be optimized according to a saturation magnetization amount of a magnetic head used, a head gap length, a recording signal band, and the like, is normally 0.01 µm to 0.15 µm, and is preferably 0.02 µm to 0.12 µm and more preferably 0.03 µm to 0.1 µm, from a viewpoint of realization of high-density recording. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is the total thickness of the layers.

A thickness of the non-magnetic layer is, for example, 0.1 to 1.5 µm and is preferably 0.1 to 1.0 µm.

A thickness of the back coating layer is preferably 0.9 µm or less and more preferably 0.1 to 0.7 µm.

Various thicknesses such as the thickness of the magnetic layer and the like can be obtained by the following method.

A cross section of the magnetic tape in the thickness direction is exposed with an ion beam and the cross section observation of the exposed cross section is performed using a scanning electron microscope. Various thicknesses can be obtained as the arithmetic mean of the thicknesses obtained at two random portions in the cross section observation. Alternatively, various thicknesses can be obtained as a designed thickness calculated under the manufacturing conditions.

<Manufacturing Step>

(Preparation of Each Layer Forming Composition)

A step of preparing a composition for forming the magnetic layer, the non-magnetic layer or the back coating layer can generally include at least a kneading step, a dispersing step, and a mixing step provided before and after these steps, in a case where necessary. Each step may be divided into two or more stages. The component used in the preparation of each layer forming composition may be added at an initial stage or in a middle stage of each step. As the solvent, one kind or two or more kinds of various solvents generally used for manufacturing a coating type magnetic recording medium can be used. For the solvent, a description disclosed in a paragraph 0153 of JP2011-216149A can be referred to, for example. In addition, each component may be separately added in two or more steps. For example, a binding agent may be separately added in a kneading step, a dispersing step, and a mixing step for adjusting viscosity after the dispersion. In order to manufacture the magnetic tape, a well-known manufacturing technology can be used in various steps. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-79274A (JP-H01-79274A) can be referred to. As a disperser, a well-known dispersion device can be used. The filtering may be performed by a well-known method in any stage for preparing each layer forming composition. The filtering can be performed by using a filter, for example. As the filter used in the filtering, a filter having a hole diameter of 0.01 to 3µm (for example, filter made of glass fiber or filter made of polypropylene) can be used, for example.

(Coating Step)

The magnetic layer can be formed by directly applying the magnetic layer forming composition onto the surface of the non-magnetic support or performing multilayer coating of the magnetic layer forming composition with the non-magnetic layer forming composition in order or at the same time. The back coating layer can be formed by applying the back coating layer forming composition onto the surface of the non-magnetic support opposite to the surface provided with the non-magnetic layer and/or the magnetic layer (or non-magnetic layer and/or the magnetic layer is to be provided). For details of the coating for forming each layer, a description disclosed in a paragraph 0066 of JP2010-231843A can be referred to.

(Other Steps)

For various other steps for manufacturing the magnetic tape, a well-known technology can be applied. For details of the various steps, descriptions disclosed in paragraphs 0067 to 0070 of JP2010-231843A can be referred to, for example. For example, the coating layer of the magnetic layer forming composition can be subjected to an alignment process in an alignment zone, while the coating layer is wet. For the alignment process, various technologies disclosed in a paragraph 0052 of JP2010-24113A can be applied. For example, a homeotropic alignment process can be performed by a well-known method such as a method using a different polar facing magnet. In the alignment zone, a drying speed of the coating layer can be controlled by a temperature and an air flow of the dry air and/or a transporting rate in the alignment zone. In addition, the coating layer may be preliminarily dried before transporting to the alignment zone.

Through various steps, a long magnetic tape raw material can be obtained. The obtained magnetic tape raw material is cut (slit) by a well-known cutter to have a width of a magnetic tape to be wound around the magnetic tape cartridge. The width is determined according to the standard and is normally ½ inches. ½ inches=12.65 mm.

In the magnetic tape obtained by slitting, normally, a servo pattern can be formed. The servo pattern will be described later in detail.

(Heat Treatment)

In one embodiment, the magnetic tape can be a magnetic tape manufactured through the following heat treatment. In addition, in another aspect, the magnetic tape can be a magnetic tape manufactured without performing the following heat treatment.

As the heat treatment, the magnetic tape slit and cut to have a width determined according to the standard described above can be wound around a core member and can be subjected to the heat treatment in the wound state.

In the one embodiment, the heat treatment is performed in a state where the magnetic tape is wound around the core member for heat treatment (hereinafter, referred to as a "core for heat treatment"), the magnetic tape after the heat treatment is wound around a reel of the magnetic tape cartridge, and a magnetic tape cartridge in which the magnetic tape is wound around the reel can be manufactured.

The core for heat treatment can be formed of metal, a resin, or paper. The material of the core for heat treatment is preferably a material having high stiffness, from a viewpoint of preventing the occurrence of a winding defect such as spoking or the like. From this viewpoint, the core for heat treatment is preferably formed of metal or a resin. In addition, as an index for stiffness, a bending elastic modulus of the material for the core for heat treatment is preferably equal to or greater than 0.2 GPa (gigapascal) and more preferably equal to or greater than 0.3 GPa. Meanwhile, since the material having high stiffness is normally expensive, the use of the core for heat treatment of the material having stiffness exceeding the stiffness capable of preventing the occurrence of the winding defect causes the cost increase. By considering the viewpoint described above, the bending elastic modulus of the material for the core for heat treatment is preferably equal to or smaller than 250 GPa. The bending elastic modulus is a value measured based on international organization for standardization (ISO) 178 and the bending elastic modulus of various materials is well known. In addition, the core for heat treatment can be a solid or hollow core member. In a case of a hollow shape, a wall thickness is preferably equal to or greater than 2 mm, from a viewpoint of maintaining the stiffness. In addition, the core for heat treatment may include or may not include a flange.

The magnetic tape having a length equal to or greater than a length to be finally accommodated in the magnetic tape cartridge (hereinafter, referred to as a "final product length") is prepared as the magnetic tape wound around the core for heat treatment, and it is preferable to perform the heat treatment by placing the magnetic tape in the heat treatment environment, in a state where the magnetic tape is wound around the core for heat treatment. The magnetic tape length wound around the core for heat treatment is equal to or greater than the final product length, and is preferably the "final product length +a", from a viewpoint of ease of winding around the core for heat treatment. This a is preferably equal to or greater than 5 m, from a viewpoint of ease of the winding. The tension in a case of winding around the core for heat treatment is preferably equal to or greater than 0.1 N (newton). In addition, from a viewpoint of preventing the occurrence of excessive deformation, the tension in a case of winding around the core for heat treatment is preferably equal to or smaller than 1.5 N and more preferably equal to or smaller than 1.0 N. An outer diameter of the core for heat treatment is preferably equal to or greater than 20 mm and more preferably equal to or greater than 40 mm, from viewpoints of ease of the winding and preventing coiling (curl in longitudinal direction). The outer diameter of the core for heat treatment is preferably equal to or smaller than 100 mm and more preferably equal to or smaller than 90 mm. A width of the core for heat treatment may be equal to or greater than the width of the magnetic tape wound around this core. In addition, after the heat treatment, in a case of detaching the magnetic tape from the core for heat treatment, it is preferable that the magnetic tape and the core for heat treatment are sufficiently cooled and magnetic tape is detached from the core for heat treatment, in order to prevent the occurrence of the tape deformation which is not intended during the detaching operation. It is preferable the detached magnetic tape is wound around another core temporarily (referred to as a "core for temporary winding"), and the magnetic tape is wound around a reel (generally, outer diameter is approximately 40 to 50 mm) of the magnetic tape cartridge from the core for temporary winding. Accordingly, a relationship between the inside and the outside with respect to the core for heat treatment of the magnetic tape in a case of the heat treatment can be maintained and the magnetic tape can be wound around the reel of the magnetic tape cartridge. Regarding the details of the core for temporary winding and the tension in a case of winding the magnetic tape around the core, the description described above regarding the core for heat treatment can be referred to. In an aspect in which the heat treatment is subjected to the magnetic tape having a length of the "final product length +α", the length corresponding to "+α" may be cut in any stage. For example, in one aspect, the magnetic tape having the final product length may be wound around the reel of the magnetic tape cartridge from the core for temporary winding and the remaining length corresponding the "+α" may be cut. From a viewpoint of decreasing the amount of the portion to be cut out and removed, the a is preferably equal to or smaller than 20 m.

The specific aspect of the heat treatment performed in a state of being wound around the core member as described above is described below.

An atmosphere temperature for performing the heat treatment (hereinafter, referred to as a "heat treatment temperature") is preferably equal to or higher than 40° C. and more preferably equal to or higher than 50° C. On the other hand, from a viewpoint of preventing the excessive deformation, the heat treatment temperature is preferably equal to or lower than 75° C., more preferably equal to or lower than 70° C., and even more preferably equal to or lower than 65° C.

A weight absolute humidity of the atmosphere for performing the heat treatment is preferably equal to or greater than 0.1 g/kg Dry air and more preferably equal to or greater than 1 g/kg Dry air. The atmosphere in which the weight absolute humidity is in the range described above is preferable, because it can be prepared without using a special device for decreasing moisture. On the other hand, the weight absolute humidity is preferably equal to or smaller than 70 g/kg Dry air and more preferably equal to or smaller than 66 g/kg Dry air, from a viewpoint of preventing a deterioration in workability by dew condensation. The heat treatment time is preferably equal to or longer than 0.3 hours and more preferably equal to or longer than 0.5 hours. In addition, the heat treatment time is preferably equal to or shorter than 48 hours, from a viewpoint of production efficiency.

(Formation of Servo Pattern)

The "formation of the servo pattern" can be "recording of a servo signal". The formation of the servo pattern will be described below.

The servo pattern is generally formed along a longitudinal direction of the magnetic tape. As a system of control using a servo signal (servo control), timing-based servo (TBS), amplitude servo, or frequency servo is used.

As shown in European Computer Manufacturers Association (ECMA)-319 (June 2001), a timing-based servo system is used in a magnetic tape based on a linear tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. In the invention and the specification, the "timing-based servo pattern" refers to a servo pattern that enables head tracking in a servo system of a timing-based servo system. As described above, a reason for that the servo pattern is configured with one pair of magnetic stripes not parallel to each other is because a servo signal reading element passing on the servo pattern recognizes a passage position thereof. Specifically, one pair of the magnetic stripes are formed so that a gap thereof is continuously changed along the width direction of the magnetic tape, and a relative position of the servo pattern and the servo signal reading element can be recognized, by the reading of the gap thereof by the servo signal reading element. The information of this relative position can realize the tracking of a data track. Accordingly, a plurality of servo tracks are generally set on the servo pattern along the width direction of the magnetic tape.

The servo band is configured of servo patterns continuous in the longitudinal direction of the magnetic tape. A plurality of servo bands are normally provided on the magnetic tape. For example, the number thereof is 5 in the LTO tape. A region interposed between two adjacent servo bands is a data band. The data band is configured of a plurality of data tracks and each data track corresponds to each servo track.

In one aspect, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pairs of servo stripes in the servo band so that the position thereof is relatively deviated in the longitudinal direction of the magnetic tape. Specifically, the position of the shifted specific servo stripe among the plurality of pairs of servo stripes is changed for each servo band. Accordingly, the recorded servo band ID becomes unique for each servo band, and therefore, the servo band can be uniquely specified by only reading one servo band by the servo signal reading element.

In a method of uniquely specifying the servo band, a staggered method as shown in ECMA-319 (June 2001) is used. In this staggered method, a plurality of the groups of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo signal reading elements.

In addition, as shown in ECMA-319 (June 2001), information showing the position in the longitudinal direction of the magnetic tape (also referred to as "Longitudinal Position (LPOS) information") is normally embedded in each servo band. This LPOS information is recorded so that the position of one pair of servo stripes is shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method of embedding the information in the servo band, a method other than the method described above can be used. For example, a predetermined code may be recorded by thinning out a predetermined pair among the group of pairs of the servo stripes.

A servo pattern forming head is also referred to as a servo write head. The servo write head generally includes pairs of gaps corresponding to the pairs of magnetic stripes by the number of servo bands. In general, a core and a coil are respectively connected to each of the pairs of gaps, and a magnetic field generated in the core can generate leakage magnetic field in the pairs of gaps, by supplying a current pulse to the coil. In a case of forming the servo pattern, by inputting a current pulse while causing the magnetic tape to run on the servo write head, the magnetic pattern corresponding to the pair of gaps is transferred to the magnetic tape, and the servo pattern can be formed. A width of each gap can be suitably set in accordance with a density of the servo pattern to be formed. The width of each gap can be set as, for example, equal to or smaller than 1 µm, 1 to 10 or equal to or greater than 10 µm.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowly decreasing an intensity of the magnetic field, while reversing a direction of the magnetic field applied to the magnetic tape. Meanwhile, the DC erasing is performed by applying the magnetic field in one direction to the magnetic tape. The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing is opposite to each other. Accordingly, the output of the servo signal obtained by the reading of the servo pattern can be increased. As disclosed in JP2012-53940A, in a case where the magnetic pattern is transferred to the magnetic tape subjected to the vertical DC erasing by using the gap, the servo signal obtained by the reading of the formed servo pattern has a unipolar pulse shape. Meanwhile, in a case where the magnetic pattern is transferred to the magnetic tape subjected to the horizontal DC erasing by using the gap, the servo signal obtained by the reading of the formed servo pattern has a bipolar pulse shape.

In addition, in one embodiment, the dimensional information of the magnetic tape in the width direction during the running can be obtained using a servo signal, and the dimension of the magnetic tape in the width direction can be controlled by adjusting and changing the tension applied in the longitudinal direction of the magnetic tape according to the obtained dimensional information. During the recording or the reproducing, the tension adjustment can contribute to suppression of recording or reproducing of data by deviating the magnetic head for recording or reproducing of data from a target track position due to width deformation of the magnetic tape.

[Magnetic Tape Cartridge]

According to another aspect of the invention, there is provided a magnetic tape cartridge comprising the magnetic tape described above.

The details of the magnetic tape included in the tape cartridge are as described above.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device in order to record and/or reproduce data on the magnetic tape, the magnetic tape is drawn from the magnetic tape cartridge and wound around the reel on the magnetic tape device side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic tape device side. In the meantime, for example, the magnetic head comes into contact with and slides on the surface of the magnetic layer of the magnetic tape, and accordingly, the recording and/or reproducing of data is performed. With respect to this, in the twin reel type magnetic tape cartridge, both reels of the supply reel and the winding reel are provided in the magnetic tape cartridge.

[Magnetic Tape Device]

According to still another aspect of the invention, there is provided a magnetic tape device comprising the magnetic tape and a magnetic head. In the magnetic tape device, the recording of data on the magnetic tape and/or the reproducing of data recorded on the magnetic tape can be performed by bringing the surface of the magnetic layer of the magnetic tape into contact with the magnetic head and sliding.

In the invention and the specification, the "magnetic tape device" means a device capable of performing at least one of the recording of data on the magnetic tape or the reproducing of data recorded on the magnetic tape. Such a device is generally called a drive. The magnetic head included in the magnetic tape device can be a recording head capable of performing the recording of data on the magnetic tape, and can also be a reproducing head capable of performing the reproducing of data recorded on the magnetic tape. In addition, in the embodiment, the magnetic tape device can include both of a recording head and a reproducing head as separate magnetic heads. In another embodiment, the magnetic head included in the magnetic tape device may have a configuration in which both the recording element and the reproducing element are comprised in one magnetic head. As the reproducing head, a magnetic head (MR head) including a magnetoresistive (MR) element capable of reading information recorded on the magnetic tape with excellent sensitivity as the reproducing element is preferable. As the MR head, various well-known MR heads (for example, a Giant Magnetoresistive (GMR) head, or a Tunnel Magnetoresistive (TMR) head) can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) including a servo signal reading element may be included in the magnetic tape device. For example, the magnetic head which performs the recording of data and/or reproducing of the recorded data (hereinafter, also referred to as a "recording and reproducing head") can include two servo signal reading elements, and each of the two servo signal reading elements can read two adjacent servo bands with the data band interposed therebetween at the same time. One or a plurality of elements for data can be disposed between the two servo signal reading elements. The element for recording data (recording element) and the element for reproducing data (reproducing element) are collectively referred to as "elements for data".

In a case of recording data and/or reproducing recorded data, first, tracking using a servo signal can be performed. That is, as the servo signal reading element follows a predetermined servo track, the element for data can be controlled to pass on the target data track. The movement of the data track is performed by changing the servo track to be read by the servo signal reading element in the tape width direction.

In addition, the recording and reproducing head can perform the recording and/or reproducing with respect to other data bands. In this case, the servo signal reading element is moved to a predetermined servo band by using the UDIM information described above, and the tracking with respect to the servo band may be started.

Figure 2:
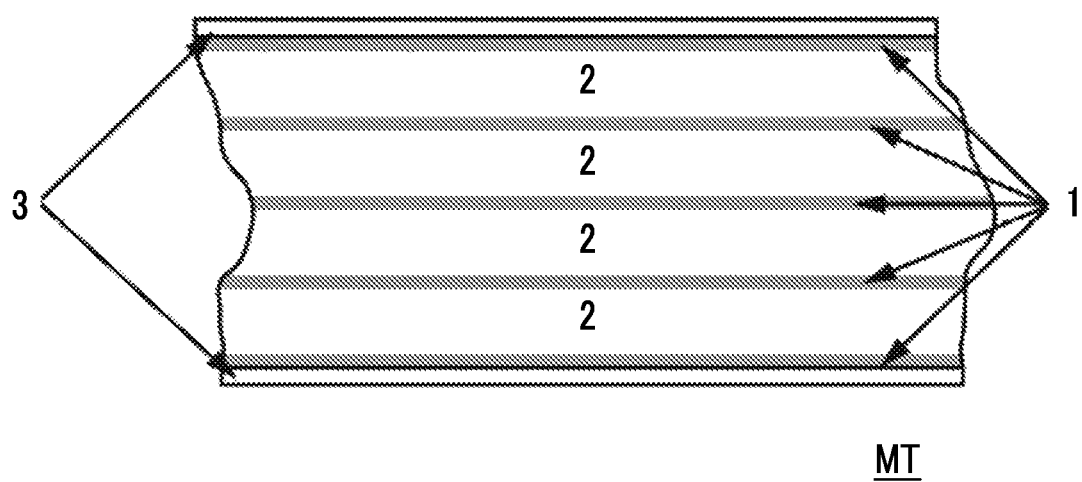
FIG. 2 shows an example of disposition of data bands and servo bands.
Figure 3:
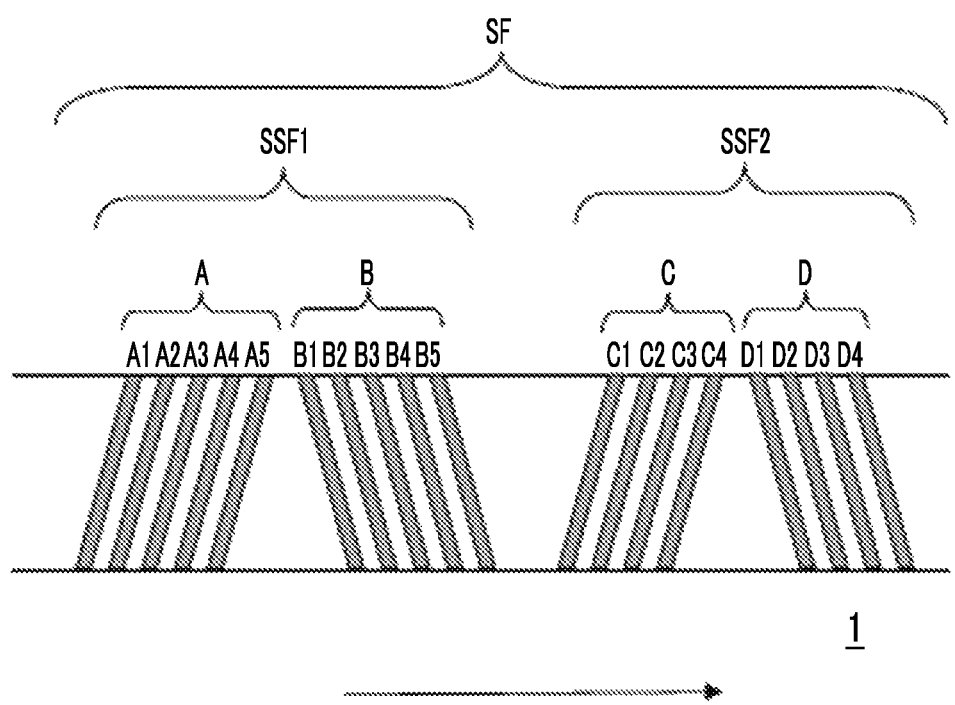
FIG. 3 shows a servo pattern disposition example of a linear tape-open (LTO) Ultrium format tape.

FIG. 2 shows an example of disposition of data bands and servo bands. In FIG. 2, a plurality of servo bands 1 are disposed to be interposed between guide bands 3 in a magnetic layer of a magnetic tape MT. A plurality of regions 2 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 3 are formed on a servo band, in a case of manufacturing a magnetic tape. Specifically, in FIG. 3, a servo frame SF on the servo band 1 is configured with a servo sub-frame 1 (SSF1) and a servo sub-frame 2 (SSF2). The servo sub-frame 1 is configured with an A burst (in FIG. 3, reference numeral A) and a B burst (in FIG. 3, reference numeral B). The A burst is configured with servo patterns A1 to A5 and the B burst is configured with servo patterns B1 to B5. Meanwhile, the servo sub-frame 2 is configured with a C burst (in FIG. 3, reference numeral C) and a D burst (in FIG. 3, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 3 shows one servo frame for explaining. However, in practice, in the magnetic layer of the magnetic tape in which the head tracking servo in the timing-based servo system is performed, a plurality of servo frames are disposed in each servo band in a running direction. In FIG. 3, an arrow shows the running direction. For example, an LTO Ultrium format tape generally includes 5,000 or more servo frames per a tape length of 1 m, in each servo band of the magnetic layer.

In the magnetic tape device, in one embodiment, the magnetic tape is treated as a removable medium (a so-called interchangeable medium), and a magnetic tape cartridge accommodating the magnetic tape is inserted into and extracted from the magnetic tape device. In another aspect, the magnetic tape is not treated as an interchangeable medium, the magnetic tape is wound around a reel of a magnetic tape device including a magnetic head, and the magnetic tape is accommodated in the magnetic tape device.

EXAMPLES

Hereinafter, one embodiment of the invention will be described with reference to examples. However, the invention is not limited to aspects shown in the examples. "Parts" and "%" in the following description mean "parts by mass" and "% by mass", unless otherwise noted. "eq" indicates equivalent and a unit not convertible into SI unit.

In addition, various steps and operations described below were performed in an environment of a temperature of 20° C. to 25° C. and a relative humidity of 40% to 60%, unless otherwise noted.

Example 1

(1) Preparation of Alumina Dispersion

An alumina dispersion used as an abrasive solution in the preparation of the magnetic layer forming composition was prepared by the following method.

10.0 parts of stearic acid, 5.0 parts of stearic acid amide, 15.7 parts of a 32% solution (solvent is a mixed solvent of methyl ethyl ketone and toluene) of a polyester polyurethane resin having a SO3Na group as a polar group (UR-4800 manufactured by Toyobo Co., Ltd. (polar group amount: 80 meq/kg)), and 570.0 parts of a mixed solution of methyl ethyl ketone and cyclohexanone (mass ratio of 1:1) as a solvent were mixed with 100.0 parts of alumina powder (HIT-80 manufactured by Sumitomo Chemical Co., Ltd.) having a gelatinization ratio of 65% and a BET specific surface area of 20 $m^2/g$, and dispersed in the presence of the dispersion beads (zirconia beads having a bead diameter shown in Table 1) by a paint shaker (dispersion time: see Table 1). After the dispersion, the dispersion liquid and the beads were separated by a mesh and an alumina dispersion was obtained.

(2) Preparation of Carbon Black Dispersion

A carbon black dispersion used as the projection formation agent liquid in the preparation of the magnetic layer forming composition was prepared by the following method.

10.0 parts of stearic acid, 5.0 parts of stearic acid amide, and 985.0 parts of cyclohexanone as a solvent were mixed with respect to 100.0 parts of carbon black having an average particle size of 80 nm, and liquid treatment was performed by performing ultrasonic treatment for 6 hours by a batch ultrasonic dispersion apparatus with a stirrer at a stirring rotation speed of 1500 rotations per minute (rpm). The liquefied carbon black dispersion was subjected to the dispersion treatment in a transverse beads mill disperser using dispersion beads (zirconia beads having a bead diameter shown in Table 1) at a bead filling ratio of 80% by volume and a rotor tip peripheral speed of 10 m/sec, by setting retention time per 1 pass as 2 minutes, at the number of dispersion passes shown in Table 1. The obtained dispersion was stirred with a dissolver stirrer at a peripheral speed of 10 m/sec for 30 minutes and then treated with a flow-type ultrasonic disperser at a flow rate of 3 kg/min for 3 passes to obtain a carbon black dispersion.

(3) Magnetic Layer Forming Composition List

Magnetic Liquid
  Ferromagnetic powder: 100.0 parts
  Hexagonal barium ferrite powder having average particle size (average plate diameter) of 21 nm (in Table 1, "BaFe")
  $SO_3Na$ group-containing polyurethane resin: 14.0 parts
  Weight-average molecular weight: 70,000, $SO_3Na$ group: 0.2 meq/g
  Cyclohexanone: 150.0 parts
  Methyl ethyl ketone: 150.0 parts
Abrasive solution
  Alumina dispersion prepared in the section (1): 40.0 parts
(Projection formation agent liquid)
  Carbon black dispersion prepared in the section (2): 10.0 parts
Other Components
  Stearic acid: 2.0 parts
  Stearic acid amide: 0.2 parts
  Butyl stearate: 2.0 parts
  Polyisocyanate (CORONATE (registered product) L manufactured by Tosoh Corporation): 2.5 parts
Finishing Additive Solvent
  Cyclohexanone: 200.0 parts
  Methyl ethyl ketone: 200.0 parts
(4) Non-Magnetic Layer Forming Composition List
  Non-magnetic inorganic powder (a-iron oxide): 100.0 parts
  Average particle size (average major axis length): 0.15 μm
  Average acicular ratio: 7
  BET specific surface area: 52 $m^2/g$
  Carbon black: 20.0 parts
  Average particle size: 20 nm
  $SO_3Na$ group-containing polyurethane resin: 18.0 parts Weight-average molecular weight: 70,000, SO$_3$Na group: 0.2 meq/g
Stearic acid: 2.0 parts
Stearic acid amide: 0.2 parts
Fatty acid ester (butyl stearate): see Table 1
Cyclohexanone: 300.0 parts
Methyl ethyl ketone: 300.0 parts
(5) Back Coating Layer Forming Composition List
Carbon black: 100.0 parts
DBP (Dibutyl phthalate) oil absorption: 74 cm$^3$/100 g
Nitrocellulose: 27.0 parts
Polyester polyurethane resin including sulfonic acid group and/or salt thereof: 62.0 parts
Polyester resin: 4.0 parts
Alumina powder (BET specific surface area: 17 m$^2$/g): 0.6 parts
Methyl ethyl ketone: 600.0 parts
Toluene: 600.0 parts
Polyisocyanate (CORONATE (registered product) L manufactured by Tosoh Corporation): 15.0 parts
(6) Preparation of Each Layer Forming Composition The magnetic layer forming composition was prepared by the following method. The magnetic liquid was prepared by dispersing (beads-dispersing) each component by using a batch type vertical sand mill for 24 hours. As dispersion beads, zirconia beads having a bead diameter of 0.5 mm were used. The prepared magnetic liquid, the abrasive solution, projection formation agent liquid, other components, and finishing additive solvent were mixed with each other and beads-dispersed for 5 minutes by using the sand mill, and the treatment (ultrasonic dispersion) was performed with a batch type ultrasonic device (20 kHz, 300 W) for 0.5 minutes. After that, the obtained mixed solution was filtered by using a filter having a hole diameter of 0.5 μm, and the magnetic layer forming composition was prepared.

The non-magnetic layer forming composition was prepared by the following method. The components described above excluding the lubricant (stearic acid, stearic acid amide, and butyl stearate) were kneaded and diluted by an open kneader, and subjected to a dispersion process with a transverse beads mill disperser. After that, the lubricant (stearic acid, stearic acid amide, and butyl stearate) was added, and stirred and mixed with a dissolver stirrer, and a non-magnetic layer forming composition was prepared.

The back coating layer forming composition was prepared by the following method. The components excluding polyisocyanate were introduced in a dissolver stirrer and stirred at a circumferential speed of 10 m/sec for 30 minutes, and the dispersion process was performed with a transverse beads mill disperser. After that, polyisocyanate was added, and stirred and mixed with a dissolver stirrer, and a back coating layer forming composition was prepared.
(7) Manufacturing of Magnetic Tape and Magnetic Tape Cartridge The non-magnetic layer forming composition prepared in the section (6) was applied to a surface of a support made of biaxial stretching polyethylene terephthalate having a thickness of 4.1 μm so that the thickness after the drying becomes 0.7 μm and was dried to form a non-magnetic layer. Then, the magnetic layer forming composition prepared in the section (6) was applied onto the non-magnetic layer so that the thickness after the drying is 0.1 μm, and a coating layer was formed. After that, a homeotropic alignment process was performed by applying a magnetic field having a magnetic field strength of 0.3 T in a vertical direction with respect to a surface of a coating layer, while the coating layer of the magnetic layer forming composition is not dried. Then, the drying was performed to form the magnetic layer. After that, the back coating layer forming composition prepared in the section (6) was applied to the surface of the support on a side opposite to the surface where the non-magnetic layer and the magnetic layer were formed, so that the thickness after the drying becomes 0.3 μm, and was dried to form a back coating layer.

After that, a surface smoothing treatment (calender process) was performed by using a calender roll configured of only a metal roll, at a speed of 100 m/min, linear pressure of 300 kg/cm), and a calender temperature (surface temperature of a calender roll) of 90° C.

Then, the heat treatment was performed by storing the long magnetic tape raw material in a heat treatment furnace at the atmosphere temperature of 70° C. (heat treatment time: 36 hours). After the heat treatment, the magnetic tape was obtained by slitting to have a width of ½ inches. By recording a servo signal on a magnetic layer of the obtained magnetic tape with a commercially available servo writer, the magnetic tape including a data band, a servo band, and a guide band in the disposition according to a linear-tape-open (LTO) Ultrium format, and including a servo pattern (timing-based servo pattern) having the disposition and shape according to the LTO Ultrium format on the servo band was obtained. The servo pattern formed by doing so is a servo pattern disclosed in Japanese Industrial Standards (JIS) X6175:2006 and Standard ECMA-319 (June 2001). The total number of servo bands is five, and the total number of data bands is four.

The magnetic tape (length of 970 m) after the servo pattern formation was wound around the winding core for heat treatment, and the heat treatment was performed in a state of being wound around this winding core. As the core for heat treatment, a solid core member (outer diameter: 50 mm) formed of a resin and having 0.8 GPa of a bending elastic modulus was used, and the tension in a case of the winding was set as 0.6 N. The heat treatment was performed at the heat treatment temperature of 50° C. for 5 hours. The weight ab solute humidity in the atmosphere in which the heat treatment was performed was 10 g/kg Dry air.

After the heat treatment, the magnetic tape and the core for heat treatment were sufficiently cooled, the magnetic tape was detached from the core for heat treatment and wound around the core for temporary winding, and then, the magnetic tape having the final product length (960 m) was wound around the reel (reel outer diameter: 44 mm) of the magnetic tape cartridge (LTO Ultrium 7 data cartridge) from the core for temporary winding. The remaining length of 10 m was cut out and the leader tape based on section 9 of Standard European Computer Manufacturers Association (ECMA)-319 (June 2001) Section 3 was bonded to the end of the cut side by using a commercially available splicing tape. As the core for temporary winding, a solid core member having the same outer diameter and formed of the same material as the core for heat treatment was used, and the tension at the time of winding was set as 0.6 N.

As described above, a single reel type magnetic tape cartridge of Example 1 in which a magnetic tape having a length of 960 m was wound around a reel was produced.

Examples 2 to 11 and Comparative Examples 1 to 7

A magnetic tape cartridge containing the magnetic tape was produced in the same manner as in Example 1, except that various items were changed as shown in Table 1.

In Table 1, in Examples and Comparative Examples in which "present" is shown in the column of "absence or presence of stearic acid and stearic acid amide contained in the preparation of alumina dispersion and carbon black dispersion", the preparation of the alumina dispersion and the carbon black dispersion was performed in the same manner as in Example 1.

For Comparative Examples described as "absent" in the above column, the alumina dispersion and the carbon black dispersion were prepared without mixing stearic acid and stearic acid amide.

In Table 1, "SrFe1" of the column of "ferromagnetic powder" indicates a hexagonal strontium ferrite powder produced as follows.

1,707 g of $SrCO_3$, 687 g of $H_3BO_3$, 1,120 g of $Fe_2O_3$, 45 g of $Al(OH)_3$, 24 g of $BaCO_3$, 13 g of $CaCO_3$, and 235 g of $Nd_2O_3$ were weighed and mixed in a mixer to obtain a raw material mixture.

The obtained raw material mixture was dissolved in a platinum crucible at a melting temperature of 1,390° C., and a tap hole provided on the bottom of the platinum crucible was heated while stirring the melt, and the melt was tapped in a rod shape at approximately 6 g/sec. The tap liquid was rolled and cooled with a water cooling twin roller to prepare an amorphous body.

280 g of the prepared amorphous body was put into an electronic furnace, heated to 635° C. (crystallization temperature) at a rate of temperature rise of 3.5° C./min, and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were separated and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 18 nm, an activation volume was 902 $nm^3$, an anisotropy constant Ku was $2.2 \times 10^5$ $J/m^3$, and a mass magnetization σs was 49 $A \times m^2/kg$.

12 mg of a sample powder was collected from the hexagonal strontium ferrite powder obtained as described above, the element analysis of a filtrate obtained by the partial dissolving of this sample powder under the dissolving conditions described above was performed by the ICP analysis device, and a surface layer portion content of a neodymium atom was obtained.

Separately, 12 mg of a sample powder was collected from the hexagonal strontium ferrite powder obtained as described above, the element analysis of a filtrate obtained by the total dissolving of this sample powder under the dissolving conditions described above was performed by the ICP analysis device, and a bulk content of a neodymium atom was obtained.

The content (bulk content) of the neodymium atom in the hexagonal strontium ferrite powder obtained as described above with respect to 100 atom % of iron atom was 2.9 atom %. In addition, the surface layer portion content of the neodymium atom was 8.0 atom %. A ratio of the surface layer portion content and the bulk content, "surface layer portion content/bulk content" was 2.8 and it was confirmed that the neodymium atom is unevenly distributed on the surface layer of the particles.

A crystal structure of the hexagonal ferrite shown by the powder obtained as described above was confirmed by scanning CuKα ray under the conditions of a voltage of 45 kV and intensity of 40 mA and measuring an X-ray diffraction pattern under the following conditions (X-ray diffraction analysis). The powder obtained as described above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: 1/4 degrees
Mask: 10 mm
Scattering prevention slit: 1/4 degrees
Measurement mode: continuous
Measurement time per 1 stage: 3 seconds
Measurement speed: 0.017 degrees per second
Measurement step: 0.05 degree In Table 1, "SrFe2" of the column of "ferromagnetic powder" indicates a hexagonal strontium ferrite powder produced as follows.

1,725 g of $SrCO_3$, 666 g of $H_3BO_3$, 1,332 g of $Fe_2O_3$, 52 g of $Al(OH)_3$, 34 g of $CaCO_3$, and 141 g of $BaCO_3$ were weighed and mixed in a mixer to obtain a raw material mixture.

The obtained raw material mixture was dissolved in a platinum crucible at a melting temperature of 1,380° C., and a tap hole provided on the bottom of the platinum crucible was heated while stirring the melt, and the melt was tapped in a rod shape at approximately 6 g/sec. The tap liquid was rolled and cooled with a water cooling twin roller to prepare an amorphous body.

280 g of the obtained amorphous body was put into an electronic furnace, heated to 645° C. (crystallization temperature), and held at the same temperature for 5 hours, and hexagonal strontium ferrite particles were precipitated (crystallized).

Then, the crystallized material obtained as described above including the hexagonal strontium ferrite particles was coarse-pulverized with a mortar, 1000 g of zirconia beads having a particle diameter of 1 mm and 800 ml of an acetic acid aqueous solution having a concentration of 1% were added to a glass bottle, and a dispersion process was performed in a paint shaker for 3 hours. After that, the obtained dispersion liquid and the beads were separated and put in a stainless still beaker. The dispersion liquid was left at a liquid temperature of 100° C. for 3 hours, subjected to a dissolving process of a glass component, precipitated with a centrifugal separator, decantation was repeated for cleaning, and drying was performed in a heating furnace at a furnace inner temperature of 110° C. for 6 hours, to obtain hexagonal strontium ferrite powder.

Regarding the hexagonal strontium ferrite powder obtained as described above, an average particle size was 19 nm, an activation volume was 1,102 $nm^3$, an anisotropy constant Ku was $2.0 \times 10^5$ $J/m^3$, and a mass magnetization σs was 50 $A \times m^2/kg$.

In Table 1, "ε-iron oxide" of the column of ferromagnetic powder indicates a ε-iron oxide powder produced as follows.

4.0 g of ammonia aqueous solution having a concentration of 25% was added to a material obtained by dissolving 8.3 g of iron (III) nitrate nonahydrate, 1.3 g of gallium (III) nitrate octahydrate, 190 mg of cobalt (II) nitrate hexahydrate, 150 mg of titanium (IV) sulfate, and 1.5 g of polyvinyl pyrrolidone (PVP) in 90 g of pure water, while stirring by using a magnetic stirrer, in an atmosphere under the conditions of an atmosphere temperature of 25° C., and the mixture was stirred for 2 hours still under the temperature condition of the atmosphere temperature of 25° C. A citric acid aqueous solution obtained by dissolving 1 g of citric acid in 9 g of pure water was added to the obtained solution and stirred for 1 hour. The powder precipitated after the stirring was collected by centrifugal separation, washed with pure water, and dried in a heating furnace at a furnace inner temperature of 80° C.

800 g of pure water was added to the dried powder and the powder was dispersed in water again, to obtain a dispersion liquid. The obtained dispersion liquid was heated to a liquid temperature of 50° C., and 40 g of ammonia aqueous solution having a concentration of 25% was added dropwise while stirring. The stirring was performed for 1 hour while holding the temperature of 50° C., and 14 mL of tetraethoxysilane (TEOS) was added dropwise and stirred for 24 hours. 50 g of ammonium sulfate was added to the obtained reaction solution, the precipitated powder was collected by centrifugal separation, washed with pure water, and dried in a heating furnace at a furnace inner temperature of 80° C. for 24 hours, and a precursor of ferromagnetic powder was obtained.

The heating furnace at a furnace inner temperature of 1,000° C. was filled with the obtained precursor of ferromagnetic powder in the atmosphere and subjected to heat treatment for 4 hours.

The heat-treated precursor of ferromagnetic powder was put into sodium hydroxide (NaOH) aqueous solution having a concentration of 4 mol/L, the liquid temperature was held at 70° C., stirring was performed for 24 hours, and accordingly, a silicon acid compound which was an impurity was removed from the heat-treated precursor of ferromagnetic powder.

After that, by the centrifugal separation process, ferromagnetic powder obtained by removing the silicon acid compound was collected and washed with pure water, and ferromagnetic powder was obtained.

The composition of the obtained ferromagnetic powder was confirmed by Inductively Coupled Plasma-Optical Emission Spectrometry (ICP-OES), and Ga, Co, and Ti substitution type ε-iron oxide (ε-$Ga_{0.28}Co_{0.05}Ti_{0.05}Fe1.62O_3$) was obtained. In addition, the X-ray diffraction analysis was performed under the same conditions as the conditions described regarding the hexagonal strontium ferrite powder SrFe 1 in advance, and it was confirmed that the obtained ferromagnetic powder has a crystal structure of a single phase which is an ε phase not including a crystal structure of an α phase and a γ phase (ε-iron oxide type crystal structure) from the peak of the X-ray diffraction pattern.

Regarding the obtained (ε-iron oxide powder, an average particle size was 12 nm, an activation volume was 746 $nm^3$, an anisotropy constant Ku was $1.2 \times 10^5$ $J/m^3$, and a mass magnetization as was 16 $A \times m^2/kg$.

The activation volume and the anisotropy constant Ku of the hexagonal strontium ferrite powder and the ε-iron oxide powder are values obtained by the method described above regarding each ferromagnetic powder by using an oscillation sample type magnetic-flux meter (manufactured by Toei Industry Co., Ltd.).

In addition, the mass magnetization σs is a value measured at the magnetic field strength of 1,194 kA/m (15 kOe) by using an oscillation sample type magnetic-flux meter (manufactured by Toei Industry Co., Ltd.).

For Examples and Comparative Examples, two magnetic tape cartridges were produced, one was used for evaluation of physical properties below, and the other one was used for evaluation of electromagnetic conversion characteristics below.

[Evaluation of Physical Properties of Magnetic Tape]

<Amount of Fluid Lubricant Collected by Wiping Surface of Magnetic Layer with a Nonwoven Fabric>

The surface of the magnetic layer of the magnetic tapes of Examples and Comparative Examples was wiped off with the nonwoven fabric by the method described above using a reel tester having the configuration shown in FIG. 1 and using 4000CR manufactured by Bileen Japan Corporation as the nonwoven fabric.

The extract was obtained by extracting the n-hexane component from the nonwoven fabric by the method described above by using the nonwoven fabric after the wiping.

As described above, since the magnetic tapes of Examples and Comparative Examples contain butyl stearate, which is a fatty acid ester, as the fluid lubricant, the butyl stearate in the obtained extract was quantified. The quantitative analysis was performed by the MRM method using GC/MS/MS. The analysis conditions were set as follows.

(Analysis conditions)

Column type: HP-5MS UI (manufactured by Agent Technologies)

Column length: 30 m

Column inner diameter: 0.25 mm

Injection amount: 1 μl (splitless)

Injector temperature: 300° C.

Detector temperature: 300° C.

Column temperature: 40° C. (0 min.)→40° C. (0.5 min.) →280° C. (16.5 min.)→STOP (18 min.)

<Projection Ccross Section Area 0.1% Spacing on Surface of Magnetic Layer>

The projection cross section area 0.1% spacing on the surface of the magnetic layer of each magnetic tape of Examples and Comparative Examples was obtained by the method described above by using Nanoscope4 manufactured by Veeco as the AFM and using RTESP-300 manufactured by BRUKER as the probe. A text file was opened as an Excel file of Excel manufactured by Microsoft Corporation, and the 262nd largest value (corresponding to 0.1%) was read with respect to 512 x 512 =262,144 values on the Excel file.

<Anisotropic Magnetic Field Hk>

Regarding the tape sample cut out from each magnetic tape of Examples and Comparative Examples, the anisotropic magnetic field Hk was obtained by the method described above by using TM-VSM5050-SMS type (manufactured by Tamagawa Seisakusho Co., Ltd.) as a vibrating sample magnetometer. The anisotropic magnetic field Hk was 25 kOe in Example 9, 30 kOe in Example 11, and in the range of 10 to 20 kOe in other examples and comparative examples.

[Evaluation of Electromagnetic Conversion Characteristics in Repeated Running in High Temperature Environment]

The following evaluations were performed in an environment where the atmosphere temperature was 60° C.±1° C. and the relative humidity was 10%.

In Examples and Comparative Examples, the magnetic tape extracted from the magnetic tape cartridge was bonded to the ½ inch reel tester in which a recording and reproducing head mounted on a LTO8 tape drive manufactured by IBM is fixed, and the recording and reproducing of data were performed by setting a relative speed between the magnetic head and the magnetic tape in a case of performing the recording and reproducing as 4 m/sec.

The recording was performed at a line recording density of 300 kfci, a reproduction output in a case of performing the reproducing was measured, and a signal-to-noise ratio (SNR) as a ratio of the reproduction output to noise was obtained. In addition, the unit kfci is a unit of linear recording density (not convertible to SI unit system).

A difference between the SNR in a case where the recording and reproducing were performed for the first running pass and the SNR in a case where the recording and reproducing were performed for the 10,000th running pass was calculated. A case in which the SNR for the 10,000th running pass was reduced by more than 5.d dB, by compared to the SNR for the first running pass was determined as NG.

In Comparative Example 6 and Comparative Example 7, the magnetic head is bonded to the surface of the magnetic layer during the repeated running and the running is stopped, and accordingly, the SNR on the 10,000-th pass in the running could not be obtained (in Table 1, shown as "stop bonding"). Therefore, Comparative Example 6 and Comparative Example 7 were also determined as NG.

Other cases was determined as OK.

The result described above is shown in Table 1 (Tables 1-1 and 1-2).

TABLE 1

|  | Example 1 | Example 2 | Example 3 | Example 4 | Example 5 | Example 6 |
|---|---|---|---|---|---|---|
| Ferromagnetic powder | BaFe | BaFe | BaFe | BaFe | BaFe | BaFe |
| Fluid lubricant amount [nm/m$^2$] | 151 | 123 | 191 | 35 | 243 | 8 |
| Absence or presence of stearic acid and stearic acid amide contained in the preparation of aluminum dispersion and carbon black dispersion | Present | Present | Present | Present | Present | Present |
| Dispersion time in the preparation of alumina dispersion | 5 h | 3 h | 7 h | 5 h | 5 h | 3 h |
| Dispersion head diameter in the preparation of alumina dispersion [mm] | 0.5 mm | 0.5 mm | 0.5 mm | 1.0 mm | 0.1 mm | 1.0 mm |
| Dispersion pass number in the preparation of carbon black dispersion | 6 passes | 4 passes | 8 passes | 6 passes | 6 passes | 4 passes |
| Dispersion bead diameter in the preparation of carbon black dispersion [mm] | 0.5 mm | 0.5 mm | 0.5 mm | 1.0 mm | 0.1 mm | 1.0 mm |
| Amount of fatty acid ester in non-magnetic layer forming composition [parts] | 2.0 parts | 2.0 parts | 2.0 parts | 0.5 parts | 0.5 parts | 0.5 parts |
| Projection cross section area 0.1% spacing [nm] | 4.2 | 6.9 | 3.4 | 14.2 | 2.9 | 19.2 |
| SNR reduction [dB] | −0.1 | −0.7 | −0.8 | −2.1 | −2.0 | −3.6 |
| Determination | OK | OK | OK | OK | OK | OK |

|  | Example 7 | Example 8 | Example 9 | Example 10 | Example 11 |
|---|---|---|---|---|---|
| Ferromagnetic powder | BaFe | BaFe | SrFe1 | SrFe2 | ε-iron oxide |
| Fluid lubricant amount [nm/m$^2$] | 389 | 224 | 148 | 150 | 142 |
| Absence or presence of stearic acid and stearic acid amide contained in the preparation of aluminum dispersion and carbon black dispersion | Present | Present | Present | Present | Present |
| Dispersion time in the preparation of alumina dispersion | 7 h | 9 h | 5 h | 5 h | 5 h |
| Dispersion head diameter in the preparation of alumina dispersion [mm] | 0.1 mm | 0.1 mm | 0.5 mm | 0.5 mm | 0.5 mm |
| Dispersion pass number in the preparation of carbon black dispersion | 8 passes | 10 passes | 6 passes | 6 passes | 6 passes |
| Dispersion bead diameter in the preparation of carbon black dispersion [mm] | 0.1 mm | 0.1 mm | 0.5 mm | 0.5 mm | 0.5 mm |
| Amount of fatty acid ester in non-magnetic layer forming composition [parts] | 0.5 parts | 2.0 parts | 2.0 parts | 2.0 parts | 2.0 parts |
| Projection cross section area 0.1% spacing [nm] | 1.9 | 1.2 | 4.0 | 4.5 | 3.9 |
| SNR reduction [dB] | −3.5 | −1.4 | −0.1 | −0.2 | −0.2 |
| Determination | OK | OK | OK | OK | OK |

TABLE 1-continued

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Ferromagnetic powder | BaFe | BaFe | BaFe | BaFe | BaFe | BaFe | BaFe |
| Fluid lubricant amount [nm/m²] | 2 | 3 | 3 | 4 | 3 | 408 | 452 |
| Absence or presence of stearic acid and stearic acid amide contained in the preparation of aluminum dispersion and carbon black dispersion | Absent | Absent | Absent | Absent | Present | Present | Absent |
| Dispersion time in the preparation of alumina dispersion | 5 hr | 5 hr | 5 hr | 5 hr | 1 hr | 7 hr | 11 hr |
| Dispersion head diameter in the preparation of alumina dispersion [mm] | 0.5 mm | 1.0 mm | 0.1 mm | 1.0 mm | 1.0 mm | 0.1 mm | 0.1 mm |
| Dispersion pass number in the preparation of carbon black dispersion | 6 passes | 6 passes | 6 passes | 6 passes | 2 passes | 8 passes | 12 passes |
| Dispersion bead diameter in the preparation of carbon black dispersion [mm] | 0.5 mm | 1.0 mm | 0.1 mm | 1.0 mm | 1.0 mm | 0.1 mm | 0.1 mm |
| Amount of fatty acid ester in non-magnetic layer forming composition [parts] | 2.0 parts | 2.0 parts | 2.0 parts | 5.0 parts | 1.0 part | 8.0 parts | 8.0 parts |
| Projection cross section area 0.1% spacing [nm] | 4.7 | 11.0 | 3.8 | 10.5 | 21.0 | 2.9 | 0.8 |
| SNR reduction [dB] | −10.5 | −9.3 | −7.5 | −7.1 | −6.5 | Stop bonding | Stop bonding |
| Determination | NG | NG | NG | NG | NG | NG | NG |

From the results shown in Table 1, it can be confirmed that the magnetic tape of the example is a magnetic tape in which the electromagnetic conversion characteristics are hardly deteriorated even after repeated running in a severe high temperature environment.

One aspect of the invention is advantageous in a technical field of the magnetic tape for various data storages.

What is claimed is:

1. A magnetic tape comprising:
   a non-magnetic support;
   a magnetic layer containing alumina, carbon black, and a ferromagnetic powder being at least one selected from the group consisting of hexagonal barium ferrite powder, hexagonal strontium ferrite powder and s-iron oxide powder; and
   a non-magnetic layer containing a non-magnetic powder between the non-magnetic support and the magnetic layer,
   wherein the magnetic layer and/or non-magnetic layer comprise at least one selected from the group consisting of a fatty acid and a fatty acid amide;
   the magnetic layer and/or non-magnetic layer comprise a fatty acid ester;
   an amount of a fluid lubricant, which is an amount of said fatty acid ester, collected by wiping a surface of the magnetic layer with a nonwoven fabric is in a range of 8 to 389 ng/m² as a value per unit area of the surface of the magnetic layer;
   the nonwoven fabric is a mixture of rayon/polyester/nylon and satisfies the following conditions:
     weight: 40±5 g/m²,
     thickness: 0.27±0.05 μm,
     width: 25 mm, and
     average fiber diameter: 10±5 μm;
   the amount of fluid lubricant is obtained by a method employing a reel tester having two tape reels, at 23° C. and a relative humidity of 50%, in which the magnetic tape is caused to run on the reel tester to bring the surface of the tape's magnetic layer into contact with the nonwoven fabric and wipe the surface with the nonwoven fabric, the running conditions of the magnetic tape being as follows:
     running speed of magnetic tape: 2 m/sec,
     tension applied in the longitudinal direction of the magnetic tape: 100 gf,
     running length of magnetic tape: 200 m,
     running pass of magnetic tape: 1 single pass, and
     lap angle θ:25°; and
   the amount of fluid lubricant collected by wiping the surface of the magnetic layer is determined, after wiping the surface of the magnetic layer, by cutting out a piece of fabric having a length of 60 mm from the nonwoven fabric, said piece of fabric including a portion which was in contact with the magnetic tape at the time of wiping, extracting components from said piece of fabric with a solvent, and analyzing the extract.

2. The magnetic tape according to claim 1,
   wherein the amount of the fluid lubricant is in the range of 30 to 250 ng/m².

3. The magnetic tape according to claim 1,
   wherein the amount of the fluid lubricant is in the range of 120 to 200 ng/m².

4. The magnetic tape according to claim 1,
   wherein a projection cross section area 0.1% spacing on the surface of the magnetic layer is in a range of 1.0 to 20.0 nm, said projection cross section area 0.1% spacing on the surface of the magnetic layer being determined as follows:
   a randomly selected region of the surface of the magnetic layer of the magnetic tape is measured by using an atomic force microscope in a tapping mode, the measurement being performed at 10 different points at a resolution of 512 pixel×512 pixel;
   the data obtained are subjected to a Flatten: 3rd-order filtering process;

the data after the filtering process are converted into a text file;

a $262^{nd}$ largest value corresponding to 0.1% is read with respect to 512×512=262,144 values, said value being defined as a projection cross section area 0.1% spacing;

the value of the projection cross section area 0.1% spacing is obtained for 10 measurement portions; and an arithmetic mean thereof is defined as the projection cross section area 0.1% spacing on the surface of the magnetic layer.

5. The magnetic tape according to claim 4, wherein the projection cross section area 0.1% spacing is in a range of 1.0 to 10.0 nm.

6. The magnetic tape according to claim 4, wherein the projection cross section area 0.1% spacing is in a range of 1.0 to 7.0 nm.

7. The magnetic tape according to claim 1, further comprising:

a back coating layer containing a non-magnetic powder on a surface side of the non-magnetic support opposite to a surface side including the magnetic layer.

8. A magnetic tape cartridge comprising:
the magnetic tape according to claim 1.

9. The magnetic tape cartridge according to claim 8, wherein the amount of the fluid lubricant is in the range of 30 to 250 ng/m$^2$.

10. The magnetic tape cartridge according to claim 8, wherein the amount of the fluid lubricant is in the range of 120 to 200 ng/m$^2$.

11. The magnetic tape cartridge according to claim 8, wherein a projection cross section area 0.1% spacing on the surface of the magnetic layer is in a range of 1.0 to 20.0 nm.

12. The magnetic tape cartridge according to claim 11, wherein the projection cross section area 0.1% spacing is in a range of 1.0 to 10.0 nm.

13. The magnetic tape cartridge according to claim 11, wherein the projection cross section area 0.1% spacing is in a range of 1.0 to 7.0 nm.

14. A magnetic tape device comprising:
the magnetic tape according to claim 1; and
a magnetic head.

15. The magnetic tape device according to claim 14, wherein the amount of the fluid lubricant is in the range of 30 to 250 ng/m$^2$.

16. The magnetic tape device according to claim 14, wherein the amount of the fluid lubricant is in the range of 120 to 200 ng/m$^2$.

17. The magnetic tape device according to claim 14, wherein a projection cross section area 0.1% spacing on the surface of the magnetic layer is in a range of 1.0 to 20.0 nm.

18. The magnetic tape device according to claim 17, wherein the projection cross section area 0.1% spacing is in a range of 1.0 to 10.0 nm.

19. The magnetic tape device according to claim 17, wherein the projection cross section area 0.1% spacing is in a range of 1.0 to 7.0 nm.

* * * * *